United States Patent
Aftanas et al.

(10) Patent No.: US 10,279,748 B2
(45) Date of Patent: May 7, 2019

(54) LOW PROFILE VEHICLE ARTICLE CARRIER HAVING SWING IN PLACE CROSS BARS

(71) Applicant: JAC Products, Inc., Saline, MI (US)

(72) Inventors: Jeffrey M. Aftanas, Ortonville, MI (US); Michael J. Presley, Plymouth, MI (US)

(73) Assignee: JAC Products, Inc., Saline, MI (US)

( * ) Notice: Subject to any disclaimer, the term of this patent is extended or adjusted under 35 U.S.C. 154(b) by 178 days.

(21) Appl. No.: 15/493,805

(22) Filed: Apr. 21, 2017

(65) Prior Publication Data
US 2017/0320445 A1    Nov. 9, 2017

Related U.S. Application Data

(60) Provisional application No. 62/332,267, filed on May 5, 2016.

(51) Int. Cl.
| B60R 9/045 | (2006.01) |
| B60R 9/04 | (2006.01) |
| B60R 9/052 | (2006.01) |
| B60R 9/058 | (2006.01) |
| B60R 9/05 | (2006.01) |

(52) U.S. Cl.
CPC .............. B60R 9/045 (2013.01); B60R 9/04 (2013.01); B60R 9/052 (2013.01); B60R 9/058 (2013.01); *B60R 9/05* (2013.01)

(58) Field of Classification Search
CPC ......... B60R 9/045; B60R 9/058; B60R 9/052; B60R 9/04; B60R 9/05
USPC ....... 224/315, 317, 321, 322, 324, 325, 326, 224/331
See application file for complete search history.

(56) References Cited

U.S. PATENT DOCUMENTS

| 5,377,890 | A | * | 1/1995 | Brunner | B60R 9/045 224/309 |
| 5,395,024 | A | * | 3/1995 | Luchtenberg | B60R 9/045 224/309 |
| 5,511,709 | A | * | 4/1996 | Fisch | B60R 9/045 224/316 |
| 6,286,739 | B1 | * | 9/2001 | Stapleton | B60R 9/045 224/309 |
| 6,811,066 | B2 | * | 11/2004 | Aftanas | B60R 9/045 224/321 |

(Continued)

*Primary Examiner* — Nathan J Newhouse
*Assistant Examiner* — Lester L Vanterpool
(74) *Attorney, Agent, or Firm* — Harness, Dickey & Pierce, P.L.C.

(57) ABSTRACT

The present disclosure relates to a low profile, highly aerodynamic swing-in-place style vehicle article carrier system for use on a wide variety of passenger cars and trucks. The system makes use of a pair of side rails that are used to support a pair of cross bars in stowed positions thereon where the cross bars are secured parallel to the side rails, or in operative positions where the cross bars are secured perpendicularly between the side rails. The side rails each incorporate a rotating end support subsystem which automatically elevates one end of its associated cross bar when the cross bar is moved pivotally into its operative position. This enables the cross bars to form a very low profile when in their stowed positions, but to be automatically raised a predetermined distance when moved into their operative positions, to thus provide additional clearance between the cross bars and an outer body surface of the vehicle.

22 Claims, 15 Drawing Sheets

(56) References Cited

U.S. PATENT DOCUMENTS

| | | | | |
|---|---|---|---|---|
| 7,066,364 B2* | 6/2006 | Kmita | B60R 9/045 224/321 |
| 7,090,103 B2* | 8/2006 | Aftanas | A61M 39/26 224/321 |
| 7,448,523 B2* | 11/2008 | Aftanas | A61M 39/26 224/321 |
| 7,458,490 B2* | 12/2008 | Klinkman | B60R 9/045 224/321 |
| 8,028,875 B2* | 10/2011 | Kmita | B60R 9/045 224/309 |
| 8,096,454 B2* | 1/2012 | Aftanas | B60R 9/045 224/321 |
| 8,251,267 B2* | 8/2012 | Aftanas | B60R 9/045 224/315 |
| 8,276,794 B2* | 10/2012 | Aftanas | B60R 9/045 224/315 |
| 8,640,934 B2* | 2/2014 | Jamieson | B60R 9/04 224/321 |
| 10,059,274 B2* | 8/2018 | Kmita | B60R 9/052 |
| 2003/0080168 A1* | 5/2003 | Aftanas | B60R 9/045 224/321 |
| 2006/0163297 A1* | 7/2006 | Moreau | B60R 9/045 224/321 |
| 2008/0252100 A1* | 10/2008 | Salvador | B60R 9/045 296/185.1 |
| 2010/0264179 A1* | 10/2010 | Johnson | B60R 9/045 224/315 |
| 2011/0240696 A1* | 10/2011 | Polewarczyk | B60R 9/045 224/321 |
| 2016/0243994 A1 | 8/2016 | Kmita | |

* cited by examiner

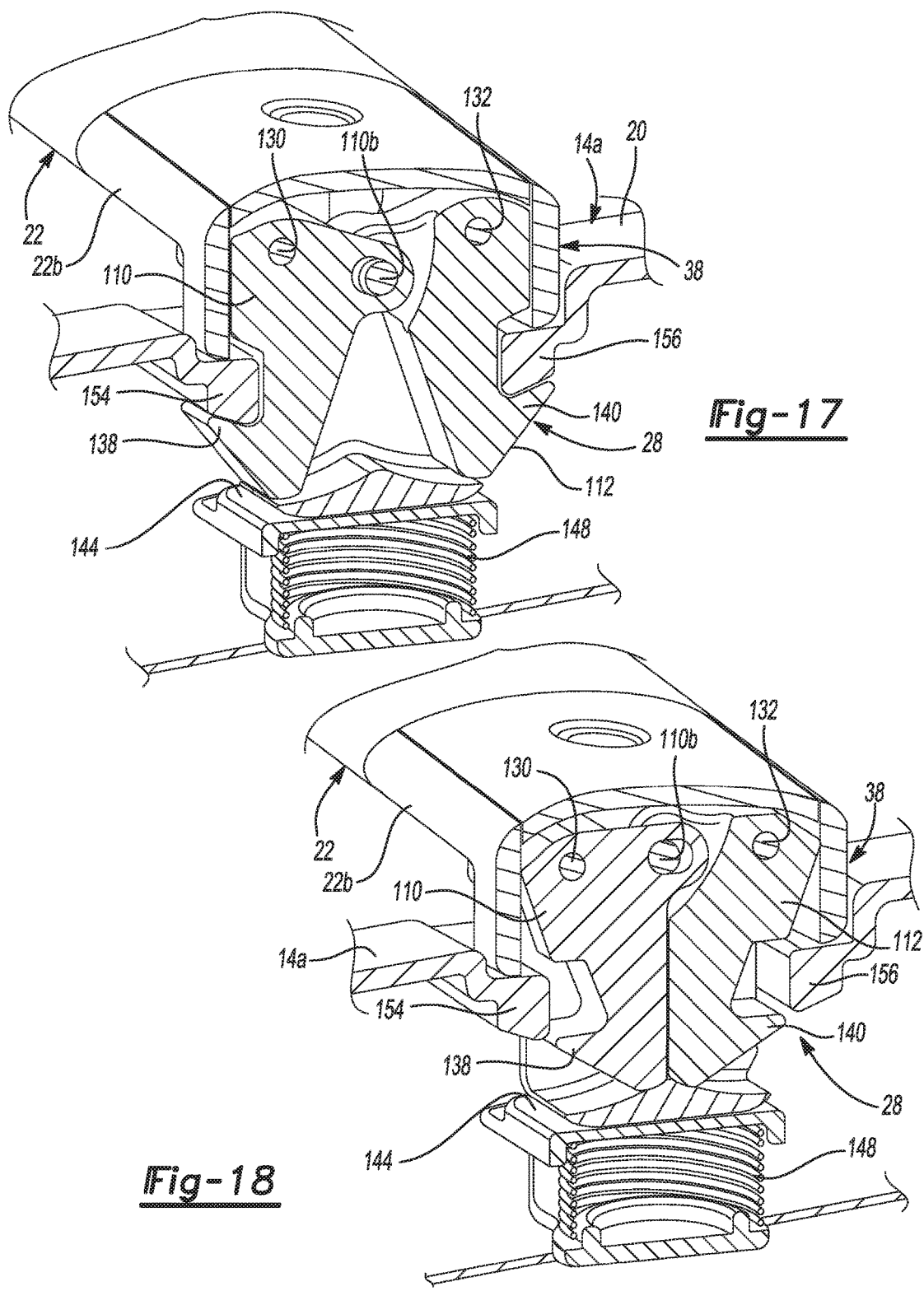

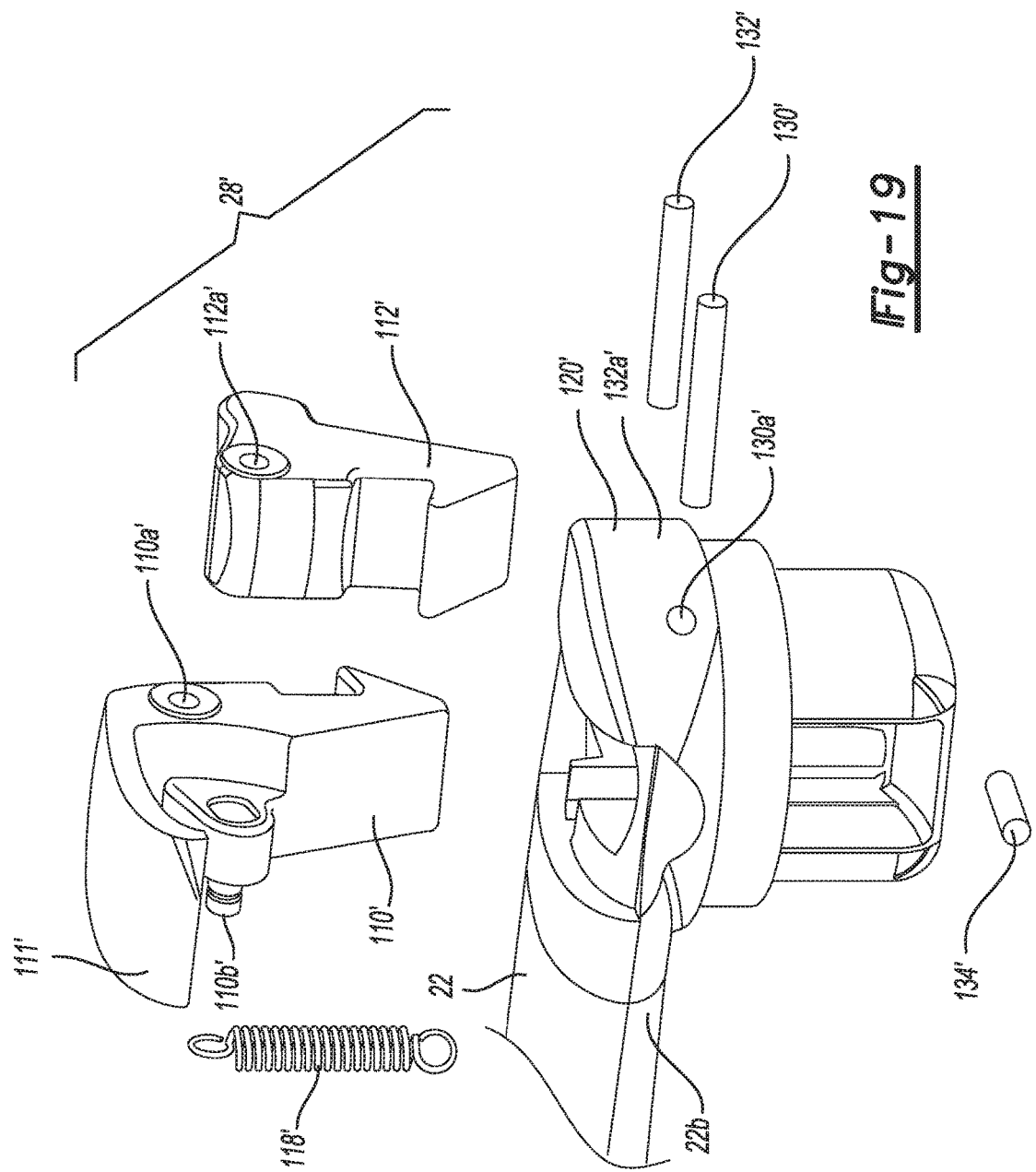

LOW PROFILE VEHICLE ARTICLE CARRIER HAVING SWING IN PLACE CROSS BARS

CROSS-REFERENCE TO RELATED APPLICATIONS

This application claims the benefit of U.S. Provisional Application No. 62/332,267, filed on May 5, 2016. The entire disclosure of the above application is incorporated herein by reference.

FIELD

The present disclosure relates to article carrier systems for use with motor vehicles, and more particularly to a low profile vehicle article carrier system having swing in place cross bars that can be conveniently stowed on respective side rails, and when needed for use, swung into place extending perpendicularly between the side rails.

BACKGROUND

The statements in this section merely provide background information related to the present disclosure and may not constitute prior art.

Vehicle article carrier systems are becoming more and more popular due in part to the decreasing size of passenger vehicles. Vehicle article carriers enable a wide variety of articles to be conveniently carried above an exterior body surface, for example the roof of a vehicle, and thereby to significantly increase the room available for passengers in the cabin area of the vehicle.

It has also become more important in recent years that the vehicle article carrier system does not detract from the aerodynamics of the vehicle. Accordingly, interest in vehicle article carrier systems that make use of stowable cross bars has grown significantly. Vehicle article carriers with stowable cross bars enable the cross bars to be stowed along respective side rail elements, when not needed, and moved into place when needed. This allows the vehicle article carrier to be configured to minimize any negative effects on the aerodynamics of the vehicle when the vehicle article carrier is not needed for use, while still allowing the cross bars of the system to be configured in an operative orientation (i.e., extending perpendicularly between the side rails) when the system is needed for use.

The assignee of the present disclosure has been a leader in the development of vehicle article carrier systems with stowable cross bars. In particular, the assignee of the present disclosure has developed a number of successful vehicle article carrier systems with "swing in place" cross bars. Such systems have cross bars that can be pivoted from one end so that they can be positioned to extend perpendicularly between a pair of fixedly mounted side rails. However, with a swing in place system, the cross bars do not need to be completely physically detached from the side rails when be repositioned from a stowed configuration to an operative configuration.

In view of the significant interest in vehicle article carrier systems that employ swing in place cross bars, there is a strong interest in further developing and improving the features and operation of such systems. There is a particularly strong interest in providing a low profile, aesthetically pleasing and highly aerodynamically efficient vehicle article carrier system with swing in place cross bars.

SUMMARY

In one aspect the present disclosure relates to a vehicle article carrier system for supporting articles elevationally above an outer body surface of a vehicle. The system may include a first side rail having a first mounting recess at a first end thereof, and a first forward latching recess and a first rear latching recess at a second end thereof. The system may further include a second side rail having a second mounting recess at a second end, and a second forward latching recess and a second rear latching recess at a first end thereof. A first cross bar may be included which has a first rotating end support subsystem at a first end thereof and being operably coupled to the first mounting recess to enable simultaneous pivotal and elevational movement of the first end of the first cross bar. A second cross bar may be included which has a second rotating end support subsystem at a first end thereof and being operably secured to the second mounting recess of the second side rail to enable simultaneous pivotal and elevational movement of the first end of the second cross bar. A first latching end support subsystem may be included for latching the first cross bar in stowed and operative positions using selected ones of the first and second forward latching recesses. A second latching end support subsystem may be included for latching the second cross bar in stowed and operative positions using selected ones of the first and second rear latching recesses. A first user engageable actuating component may be included for enabling unlatching of the first latching end support subsystem, to thus enable the first cross bar to be moved from an operative position to a stowed position, or from the stowed position to the operative position. A second user engageable actuating component may be included for enabling unlatching of the second latching end support subsystem, to thus enable the second cross bar to be moved from the operative position to the stowed position, or from the stowed position to the operative position. Both of the first cross bar and the second cross bar may reside at a first elevation when in their stowed positions, over the first and second side rails, respectively, thus forming low profile configurations, and both are moved elevationally to a second elevation above the first elevation when rotated into their operative positions extending perpendicularly between the first and second side rails.

In another aspect the present disclosure relates to a vehicle article carrier system for supporting articles elevationally above an outer body surface of a vehicle. The system may include a first side rail having a first mounting recess at a first end thereof, and a first forward latching recess and a first rear latching recess at a second end thereof. The system may further include a second side rail having a second mounting recess at a second end, and a second forward latching recess and a second rear latching recess at a first end thereof. The system may also include a first cross bar having a first rotating end support subsystem at a first end thereof which is operably coupled to the first mounting recess to enable simultaneous pivotal and elevational movement of the first end of the first cross bar. The system may also include a second cross bar having a second rotating end support subsystem at a first end thereof which is operably secured to the second mounting recess of the second side rail, to enable simultaneous pivotal and elevational movement of the first end of the second cross bar. The system may further include a first latching end support subsystem arranged at a second end of the first cross bar and adapted to be coupled to the first forward latching recess of the first side rail or the second forward latching recess of the second side rail. The system may include a second latching end support subsystem arranged at a second end of the second cross bar and adapted to be coupled to the first rear latching recess of the first side rail or the second rear latching recess of the second side rail. A first actuating component may be included which is operably associated with the first rotating end support subsystem and operably coupled with the first latching end support subsystem, for securing the first cross bar in both an operative position and a stowed position. A second actuating component may be included which is operably associated with the second rotating end support subsystem of the second cross bar, and operably coupled with the second latching end support subsystem, for securing the second cross bar in both an operative position and a stowed position. The system provides a feature that the first cross bar resides at a first elevation when in the stowed position, over the first side rail, forming a low profile configuration, and is moved elevationally to a second elevation above the first elevation when rotated into the operative position such that the first cross bar extends perpendicularly between the first and second side rails. The system provides the further feature that the second cross bar resides at the first elevation when in the stowed position, over the second side rail, forming a low profile configuration, and is moved elevationally into the second elevation when the second cross bar is rotated into the operative position extending perpendicularly between the first and second side rails.

In still another aspect the present disclosure relates to a vehicle article carrier system for supporting articles elevationally above an outer body surface of a vehicle. The system may include a first side rail having a first mounting recess at a first end thereof, and a first forward latching recess and a first rear latching recess at a second end thereof. The system may further include a second side rail having a second mounting recess at a second end, and a second forward latching recess and a second rear latching recess at a first end thereof. A first cross bar may be included which has a first rotating end support subsystem at a first end thereof and which is operably coupled to the first mounting recess to enable simultaneous pivotal and elevational movement of the first end of the first cross bar. A second cross bar may be included which has a second rotating end support subsystem at a first end thereof and which is secured to the second mounting recess of the second side rail to enable simultaneous pivotal and elevational movement of the first end of the second cross bar. The system may further include a first latching end support subsystem operably associated with a second end of the first cross bar, and securable at either the forward latching recess of the first side rail or the forward latching recess of the second side rail. The system may further include a second latching end support subsystem operably associated with a second end of the second cross bar, and securable at either the rear latching recess of the first side rail or the rear latching recess of the second side rail. Each of the first and second rotating end support subsystems may include an actuating element for placing one of the first or second rotating end support subsystems in an unlocked condition; an upper mounting body; and a lower mounting member having a plurality of arms that cooperate with the upper mounting body to cause a change in an elevation of its associated said first or second cross bar as its associated first or second cross bar is pivoted in a generally horizontal plane between the stowed and operative positions.

BRIEF DESCRIPTION OF THE DRAWINGS

The drawings described herein are for illustration purposes only and are not intended to limit the scope of the present disclosure in any way.

FIG. 9b is a perspective view of a rear surface of the camming element along with the torsion spring shown in FIG. 9a;

FIG. 17 is a simplified side cross sectional perspective view of the latching end support subsystem engaged within the latching recess;

FIG. 18 shows the latching end support subsystem of FIG. 17 but with the latching arms in their retracted positions;

FIG. 19 shows another embodiment of the latching end support subsystem in which one of the latching arms is provided with a graspable portion that forms an actuating component, and which allows the cross bar to be unlocked from its stowed or operative position at the second end of the cross bar rather than at the first end;

DETAILED DESCRIPTION

Figure 1:
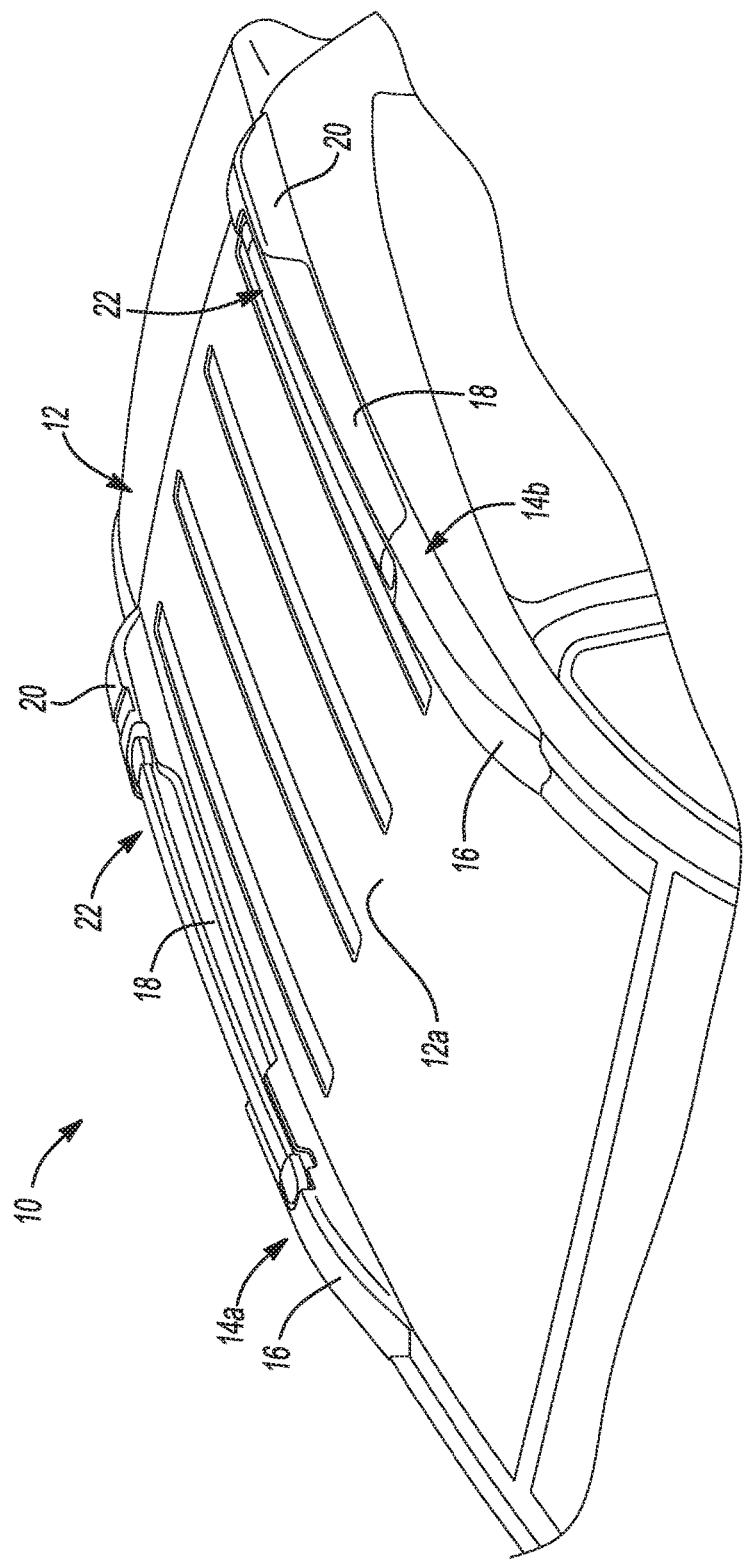
FIG. 1 is a perspective view of a low profile, vehicle article carrier system in accordance with one embodiment of the present disclosure, and showing a pair of swing in place cross bars of the system in their stowed positions.

The following description is merely exemplary in nature and is not intended to limit the present disclosure, application, or uses. It should be understood that throughout the drawings, corresponding reference numerals indicate like or corresponding parts and features.

Referring to FIG. 1 there is shown an article carrier system 10 in accordance with one embodiment of the present disclosure. The system 10 is installed on a vehicle 12. The vehicle 12 may be virtually any form of vehicle such as, but not limited to, a sedan, an SUV, a minivan or a full size cargo van. The system 10 can also be employed on pickup trucks, either on a roof of a cab of a pickup truck or over the bed of a pickup truck. If employed over the bed, the system 10 would be supported from the upper edges of the sidewalls of the bed to form a means for supporting articles above a floor of the bed.

Figure 2:
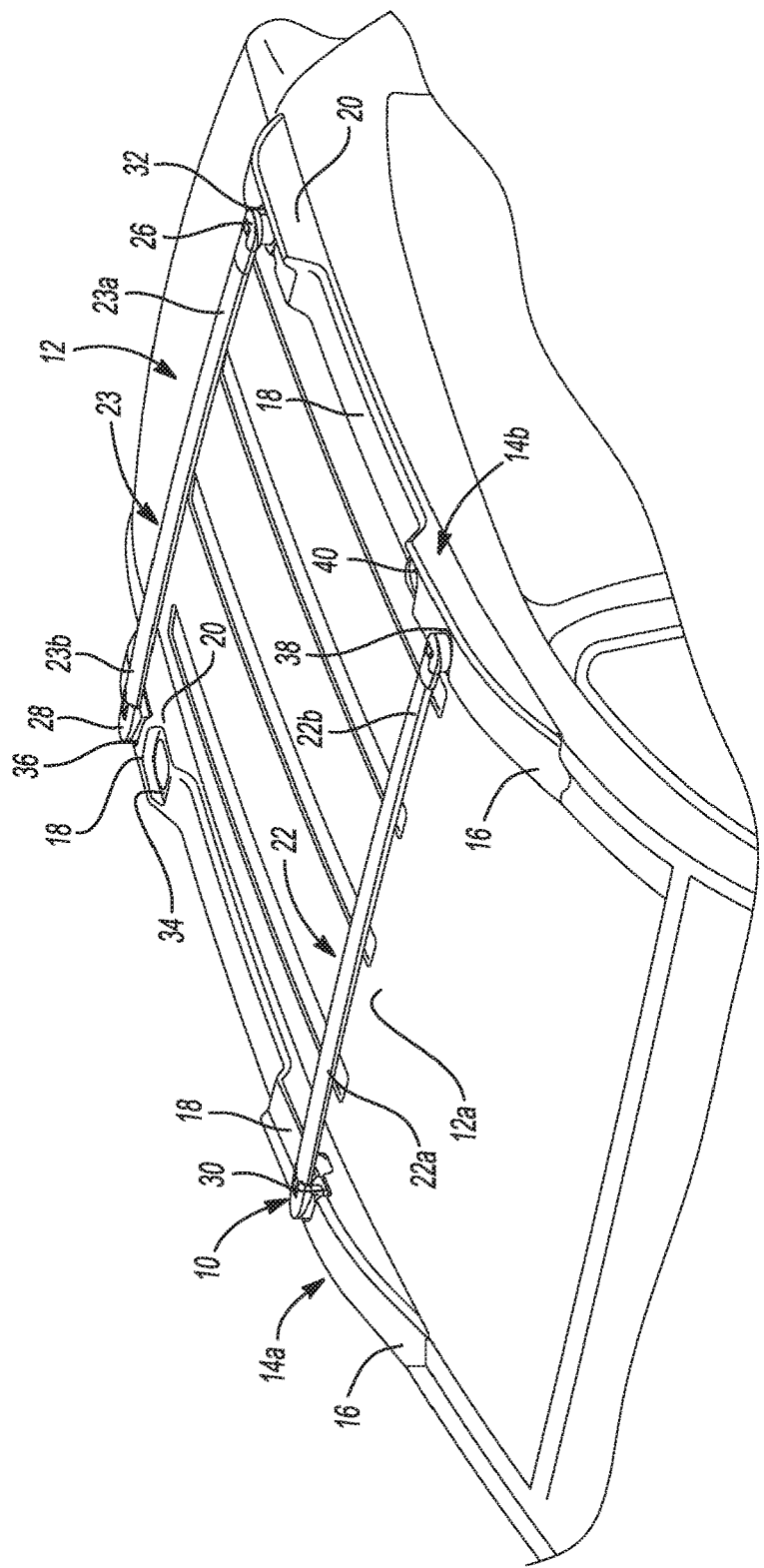
FIG. 2 is a perspective view of the system of FIG. 1 but showing the cross bars in their operative positions.

The system 10 includes a pair of elongated side rails 14a and 14b that are fixedly mounted to the an outer body surface 12a, in this case a roof, of the vehicle 12 by suitable fasteners well known in the industry. The side rails 14a and 14b each include a highly aerodynamic front portion 16, recessed portions 18 and a rear portion 20. The recessed portion 18 of each side rail 14a and 14b has a length sufficient to house an associated cross bar 22 or 23 therein when the cross bar is in a stowed configuration. FIG. 1 shows the cross bars 22 and 23 stowed in their respective recessed portions 18 while FIG. 2 shows the cross bars 22 and 23 in their operative orientations extending perpendicularly between the side rails 14. The system 10 thus forms a "swing in place" vehicle article carrier system in which the cross bars 22 and 23 can be stowed on their respective side rails 14 when not needed for use, and quickly and easily rotated into their operative configurations when needed. This allows the system 10 to present an extremely aerodynamically efficient, as well as highly visually appealing, profile when the cross bars 22 and 23 are stowed.

Figure 3:
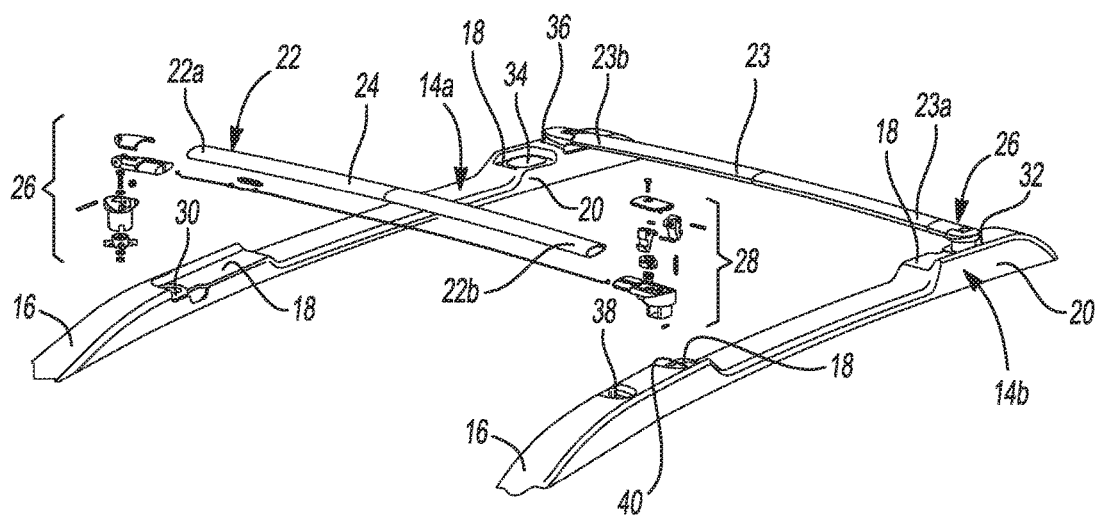
FIG. 3 is an exploded perspective view of the components associated with one of the cross bars of the system, as well as structure associated with each of the side rails which enables the cross bars to be secured in stowed positions on respective ones of the cross bars, as well as secured in operative positions extending perpendicularly between the side rails.

Referring to FIG. 3, the construction of cross bar 22 can be seen in greater detail along with its various components required to secure it for swing in place movement between the side rails 14. The cross bars 22 and 23 in this example are identical in construction, so only cross bar 22 will be described in detail. Cross bar 22 includes a tubular central section 24, a rotating end support subsystem 26 at first end 22a, and a latching end support subsystem 28 at a second end 22b. Side rail 14a includes a single mounting recess 30 in its front portion 16, while side rail 14b includes an identical mounting recess 32 in its rear portion 20. The first end 22a of cross bar 22 is rotationally and elevationally secured to its associated mounting recess 30, and moveable about the mounting recess 30 between its stowed and operative positions. A first end 23a of cross bar 23 is rotationally and elevationally secured at its associated mounting recess 32 by its rotating end support subsystem 26, and likewise is moveable about the mounting recess 32 between stowed and operative positions. Side rail 14a also includes a forward latching recess 34 and a rear latching recess 36, both positioned in its rear portion 20. Conversely, side rail 14b includes a forward latching recess 38 and a rear latching recess 40, both positioned in its front portion 16.

In its operative position, the second end 22b of the cross bar 22 is secured at the forward latching recess 38 of side rail 14b. In its stowed position, the second end 22b of the cross bar 22 is secured at the forward latching recess 34 of side rail 14a, and rests substantially within the recess portions 18 of the side rail 14a. This allows the side rail 14a and the cross bar 22 to form a low profile, as well as a highly aerodynamically efficient and aesthetically pleasing profile. In its operative position, the second end 23b of cross bar 23 is coupled to the rear latching recess 36 of side rail 14a by its latching end support subsystem 28, and in its stowed position it is coupled to the rear latching recess 40 in side rail 14b.

Figure 4:
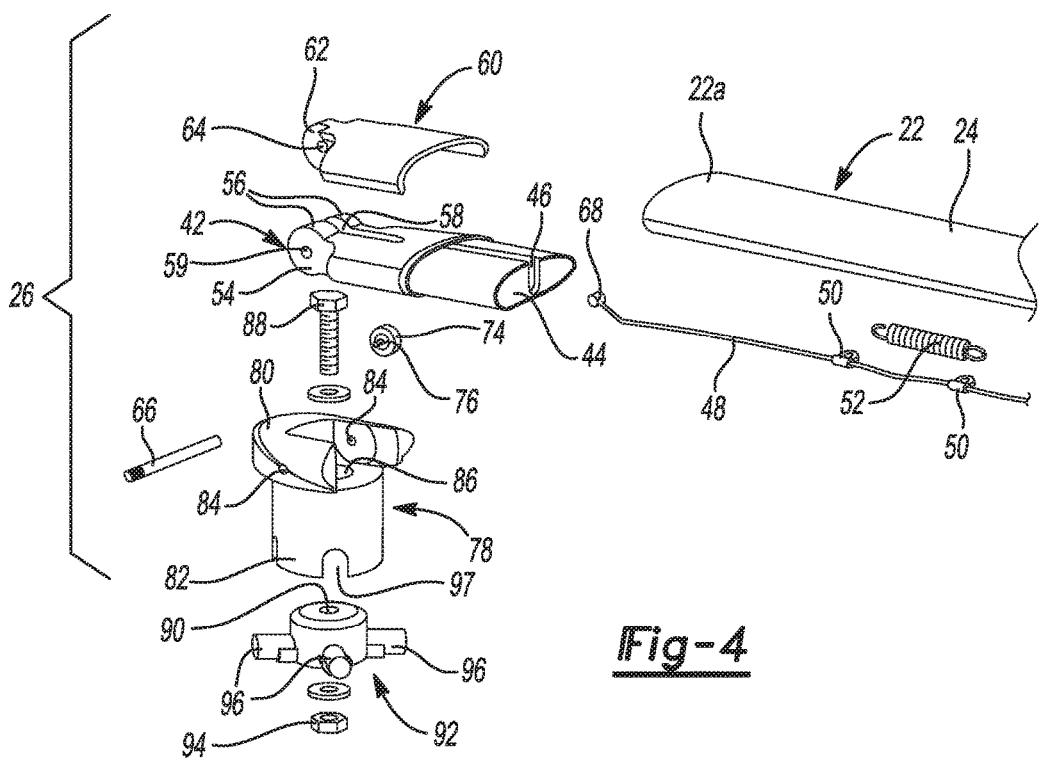
FIG. 4 is an exploded perspective view of the components associated with the rotating end support subsystem used at the first end of each cross bar of the system.

Referring to FIG. 4, the construction of the rotating end support subsystem 26 can be seen in greater detail. The rotating end support subsystem 26 includes an end support 42 having a neck portion 44 which fits within the tubular central section 24 of the cross bar 22. The end support 42 has a groove 46 which receives one end of a cable 48. The cable 48 includes a pair of fixedly secured tabs 50 between which are secured the opposite ends of a coil spring 52. The coil spring 52 helps to take up slack in the cable 48 when the cross bar 22 is fully assembled.

Figure 5:
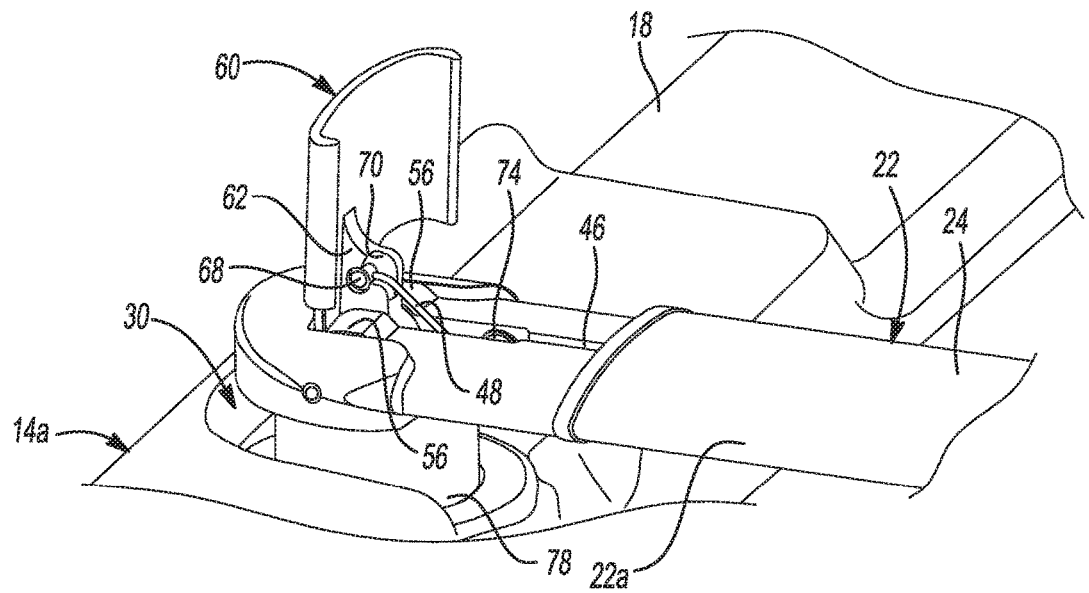
FIG. 5 is an enlarged perspective view of the first end of the cross bar of FIG. 3 showing the actuating lever in its opened condition.
Figure 6:
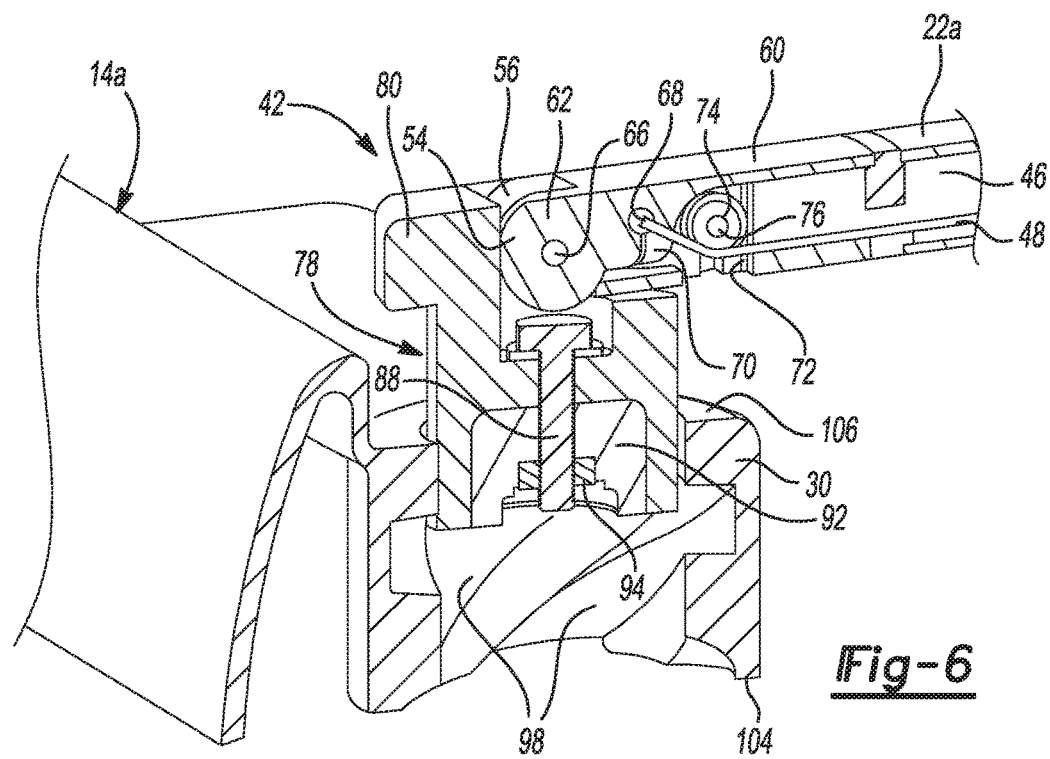
FIG. 6 is a simplified side cross sectional view of the rotating end support subsystem shown in FIG. 4 further illustrating its coupling to the mounting recess in the side rail.

With reference to FIGS. 4, 5 and 6, the end support 42 further includes a rounded end portion 54 having a pair of spaced apart arms 56 projecting therefrom which form a slot 58 therebetween. The slot 58 receives a neck portion 62 of a user engageable actuating component, which in this example is a user graspable, pivotally mounted actuating lever 60. The neck portion 62 also has a bore 64 which receives a pin 66. This enables the actuating lever 60 to pivot about the end support 42 between closed and opened positions.

With reference to FIGS. 5 and 6, an end of the cable 48 includes a tab 68 which is captured within a recess 70 in the neck portion 62 of the actuating lever 60. This allows the actuating lever 60 to pull on the cable 48 when the actuating lever 60 is pulled upwardly into its open position as shown in FIG. 5. The end support 42 further includes a recess 72 (FIG. 6) in which a guide wheel 74 is inserted. The guide wheel 74 is mounted within the recess 72 (FIG. 6) for rotational movement about a pin 76. Once the cable 48 is assembled onto the end support 42, the tension provided on the cable at the opposite end of the cross bar 22 (to be discussed in the following paragraphs) ensures that the guide wheel 74 and its pin 76 do not move out of position in the recess 72.

Referring further to FIG. 4, the rotating end support subsystem 26 further includes an upper mounting body 78 having a U-shaped upper portion 80 and a recessed lower portion 82. The U-shaped upper portion 80 receives the rounded end portion 54 of the end support 42. The pin 66 may be positioned through bores 84 in the U-shaped upper portion 80 and through bore 59 in the rounded end portion 54 to secure the rounded end portion for pivoting movement within the U-shaped upper portion 80, and about a first axis. The upper mounting body 78 also includes a bore 86 into which a threaded bolt 88 may be inserted. The threaded bolt 88 also extends through a bore 90 in a lower mounting member 92. A nut 94 may be used to secure the lower mounting member 92 to the upper mounting body 78.

FIG. 4 also shows that the lower mounting member 92 includes a plurality of outwardly projecting cylindrical arms 96 spaced approximately every 90 degrees. The lower mounting member 92 is captured in the recessed lower portion 82 with the arms 96 projecting outwardly from cutout sections 97 in the lower mounting member 92. Once the lower mounting member 92 is assembled to the upper mounting body 78, it is fixedly secured relative to the upper mounting body 78. As such, when the cross bar 22 is rotated, the arms 96 rotate as well, enabling the cross bar 22 to pivot about a second axis which is orthogonal to the first axis mention above.

Figure 7:
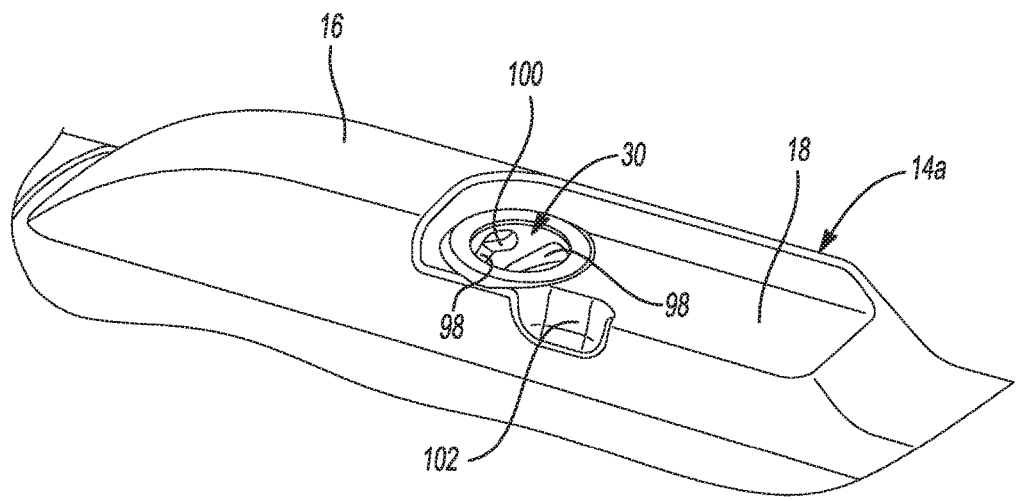
FIG. 7 is a perspective view of the mounting recess shown in FIG. 5 better illustrating portions of the helical grooves formed therein.
Figure 8:
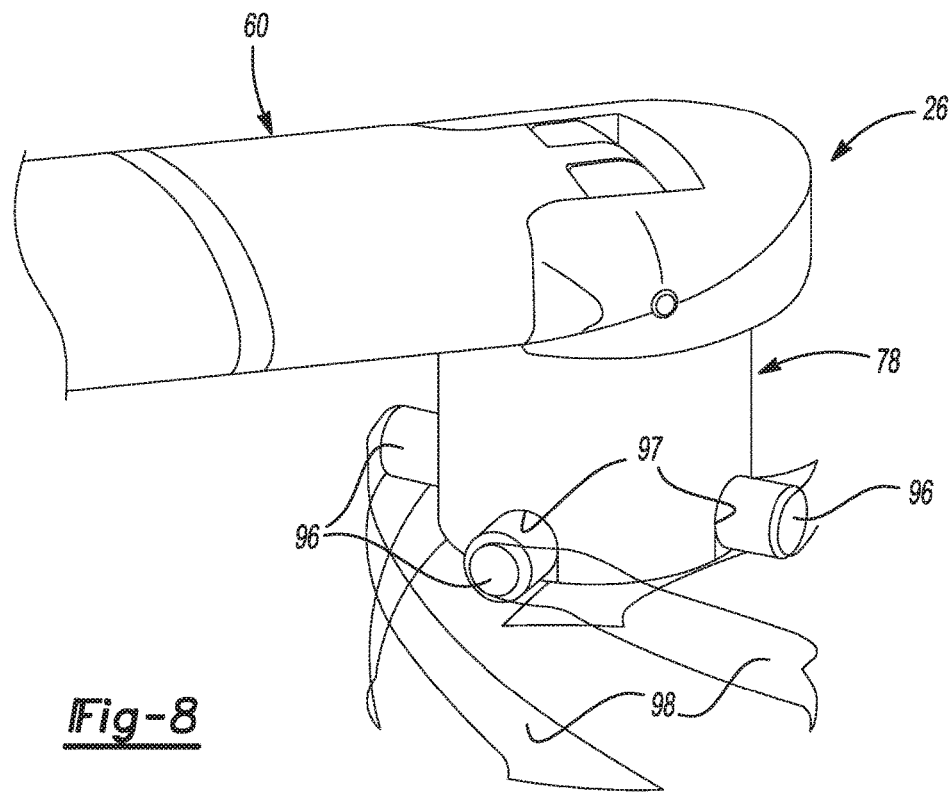
FIG. 8 is a simplified perspective view of the rotating end support subsystem showing the arm portions of the upper mounting body engaged within the helical grooves of the mounting recess.

With reference to FIGS. 7 and 8, it can be seen that the mounting recess 30 includes a plurality of helical grooves 98. In this example four such helical grooves 98 are provided, one for receiving at outermost end portion of each of the arms 96. Each of the helical grooves 98 also includes a flat section 100. The helical grooves 98 serve to elevate the first end 22a of the cross bar 22 as the cross bar 22 is rotated from its stowed position to its operative position. The flat sections 100 are further constructed so that the cross cylindrical arms 96 reach and ride onto the flat sections 100 just before the cross bar 22 reaches the forward latching recess 38 when being rotated into the operative position. The flat sections 100 provide a solid support surface, as well as providing for a small degree of rotational travel which helps the user in aligning the second end 22b of the cross bar 22 with the forward latching recess 38. Optionally, but preferably, the front portion 16 of the side rail 14a can be provided with a cutout or scalloped section 102 which allows the user to more easily grasp the actuating lever 60 with a finger or thumb when the actuating lever is in its closed position, and thus aids the user in initially lifting the actuating lever into its opened position.

The lower mounting member 92 may be assembled into the mounting recess 30 from a lower end 104 of the mounting recess, as shown in FIG. 6. Once the lower mounting member 92 is positioned in the mounting recess 30, it may be rotated so that the arms 96 engage in the helical grooves 98. When the lower mounting member 92 has been advanced up to near an upper end 106 of the mounting recess 30, the upper mounting body 78 can be secured to the lower mounting member 92 via the threaded bolt 88 and threaded nut 94. The actuating lever 60 may then be assembled onto the upper mounting body 78.

This rotating end support subsystem 26 is a significant feature of the system 10 because of the strong desire for the system 10 to form a low and aerodynamic profile when the cross bars 22 and 23 are in their stowed positions. The rotating end support subsystem 26 allows the cross bar 22 to assume a very low profile when in its stowed position, and further enables the first end 22a of the cross bar 22 to be elevationally moved upwardly during rotation of the cross bar into its operative position. The elevated position of the cross bar 22 when it is positioned in its operative position also provides for an additional degree of clearance between the cross bar 22 and the outer body surface 12a of the vehicle 12, which can be useful when attaching clamps associated with bicycle racks, ski racks, luggage boxes, etc. to the cross bar 22.

Referring to FIGS. 9a-9f and 14, the various components of the latching end support subsystem 28 of the cross bar 22 can be seen in greater detail. With specific reference to FIG. 9a, the latching end support subsystem 28 includes a cover 108, a pair of latching arms 110 and 112, a camming element 114, a torsion spring 116, a coil spring 118, and a main body portion 120. The main body portion 120 includes a neck portion 122 that fits within the tubular central portion 24 of the cross bar 22, and also includes a groove 124 for receiving an end of the cable 48.

Figure 9A:
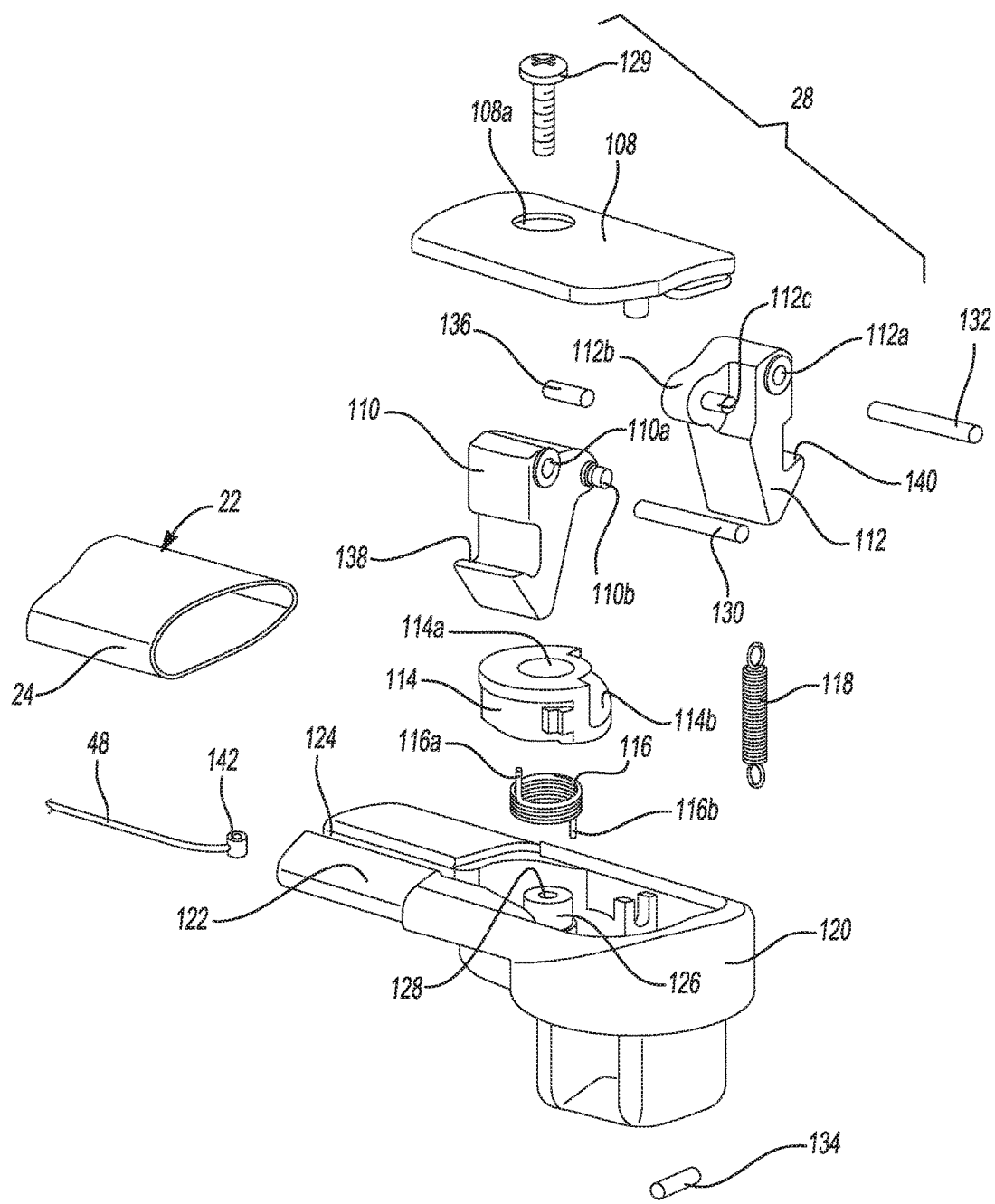
FIG. 9a is an exploded perspective view of the latching end support subsystem at the second end of the cross bar of FIG. 3.
Figure 9B:
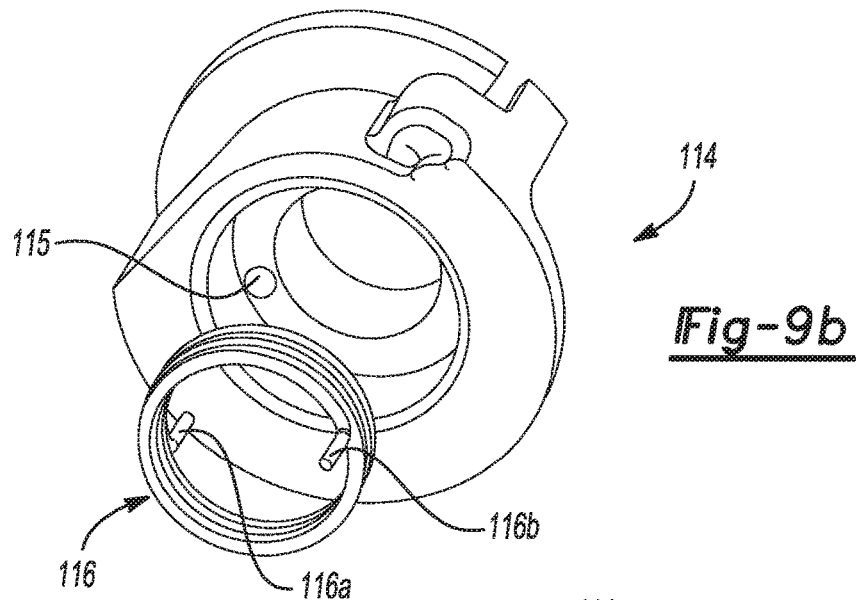
Figure 9C:
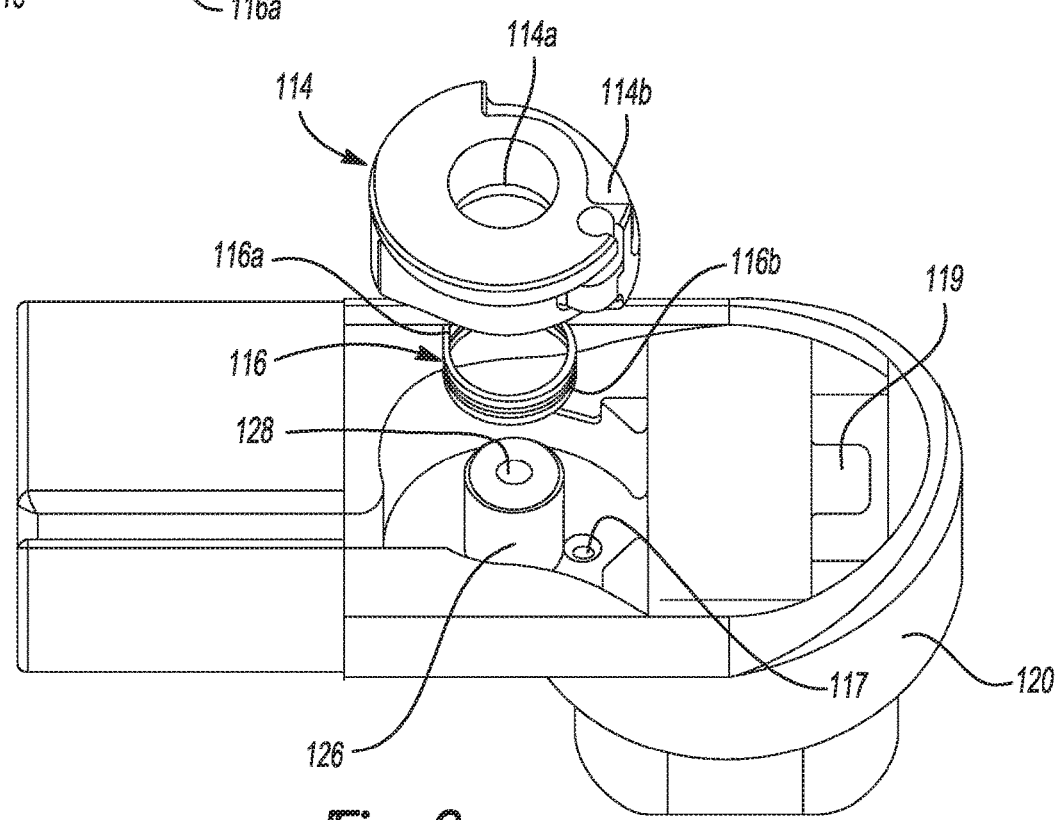
FIG. 9c a top perspective view of the main body shown in FIG. 9a, and further showing how the camming element and the torsion spring are mounted in the main body.

The torsion spring 116 is positioned over a boss 126 which has a threaded bore 128. The camming element 114 is positioned over boss 126 one tang 116a of the torsion spring 116 engages in a hole 115 in a back side of the camming element as shown in FIG. 9b. The other tang 116b of the torsion spring 116 engages within a hole 117 (FIG. 9c) in the main body 120 so that the torsion spring is able to exert a rotational biasing force on the camming element 114 which serves to bias the latching arms 110 and 112 into outward latching positions, which will be explained further in the following paragraphs. A threaded bolt 129 is positioned through a hole 108a in the cover 108, through hole 114a in the camming element 114, and threadably engages the threaded bore 128 in the boss 126 to secure the camming element for rotational movement about the boss.

Figure 9D:
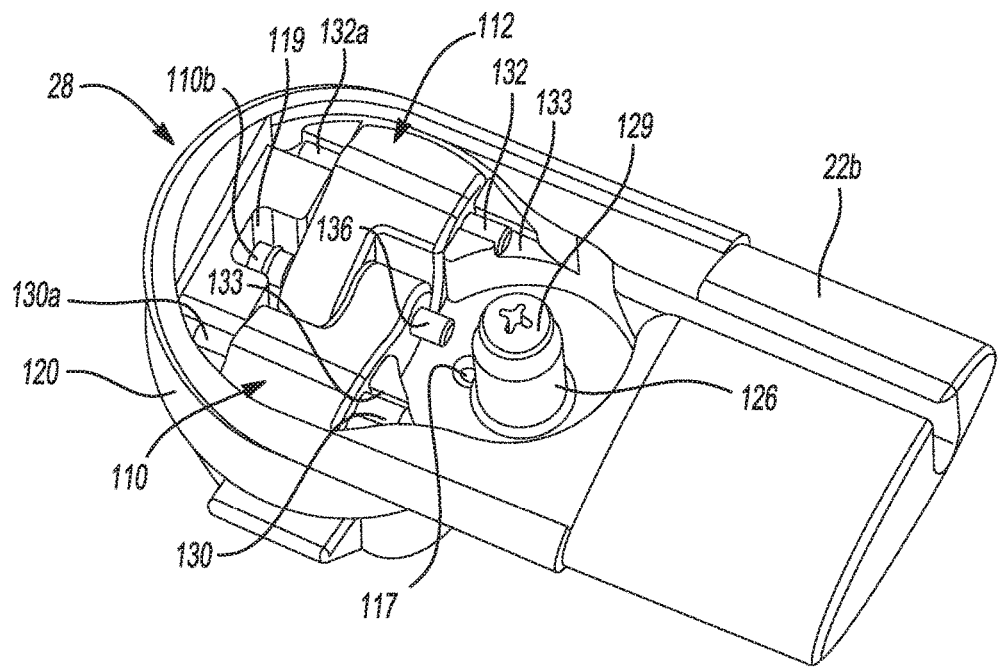
FIG. 9d is a top perspective view of the latching end support system showing how the latching arms are supported in the main body for pivoting movement.

Referring further to FIGS. 9a, 9d, 11 and 12, the latching arms 110 and 112 each include bores 110a and 112a through which pins 130 and 132 are inserted to allow pivoting motion of the latching arms. Pins 130 and 132 are seated in channels 130a and 132a in the main body 120 as shown in FIG. 9d. Latching arm 110 includes a portion of a pin 110b projecting therefrom which is coupled to an upper end of the spring 118. Pin 110b is positioned within well 119 shown in FIG. 9d when the latching end support subsystem 28 is fully assembled. The lower end of the spring 118 is coupled to a pin 134. Pin 134 is inserted in a slot (not shown) in the main body portion 120. The spring 118 thus serves to bias the latching arms 110 and 112 outwardly away from one another, which effectively allows the latching arms to assume a normally latched orientation unless the user moves the actuating lever 60 into the opened position. This will be described further in the following paragraphs.

Figure 9E:
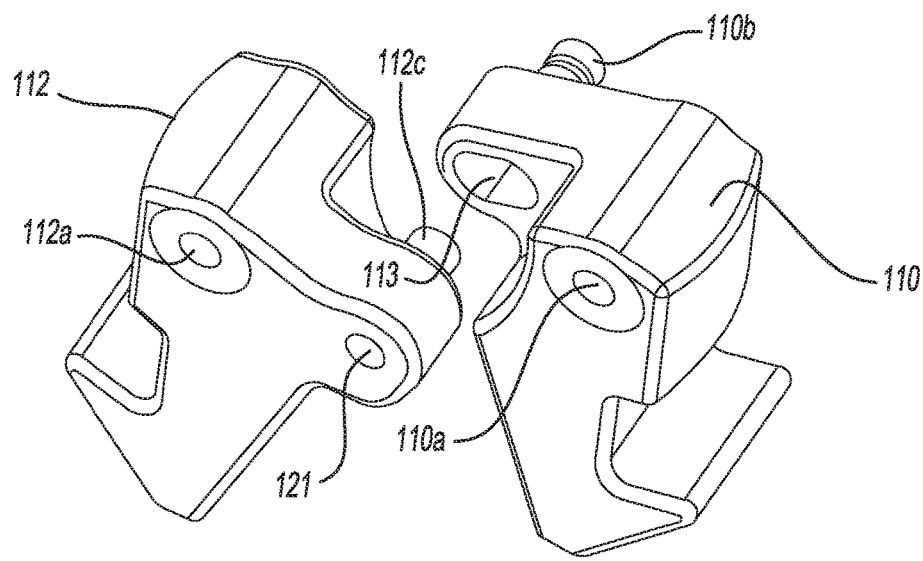
FIG. 9e is a perspective view of just the two latching arms better showing the slot in which a pin of one of the latching arms engages.
Figure 9F:
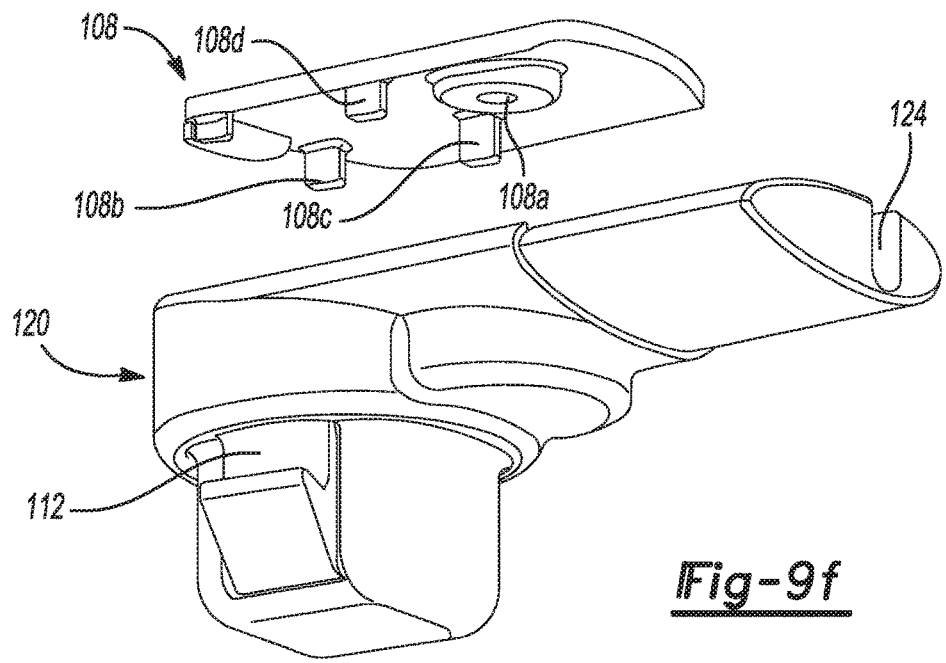
FIG. 9f is a perspective lower side view of the latching end support system better illustrating an underside of the cover and the tabs projecting from the underside of the cover.
Figure 10:
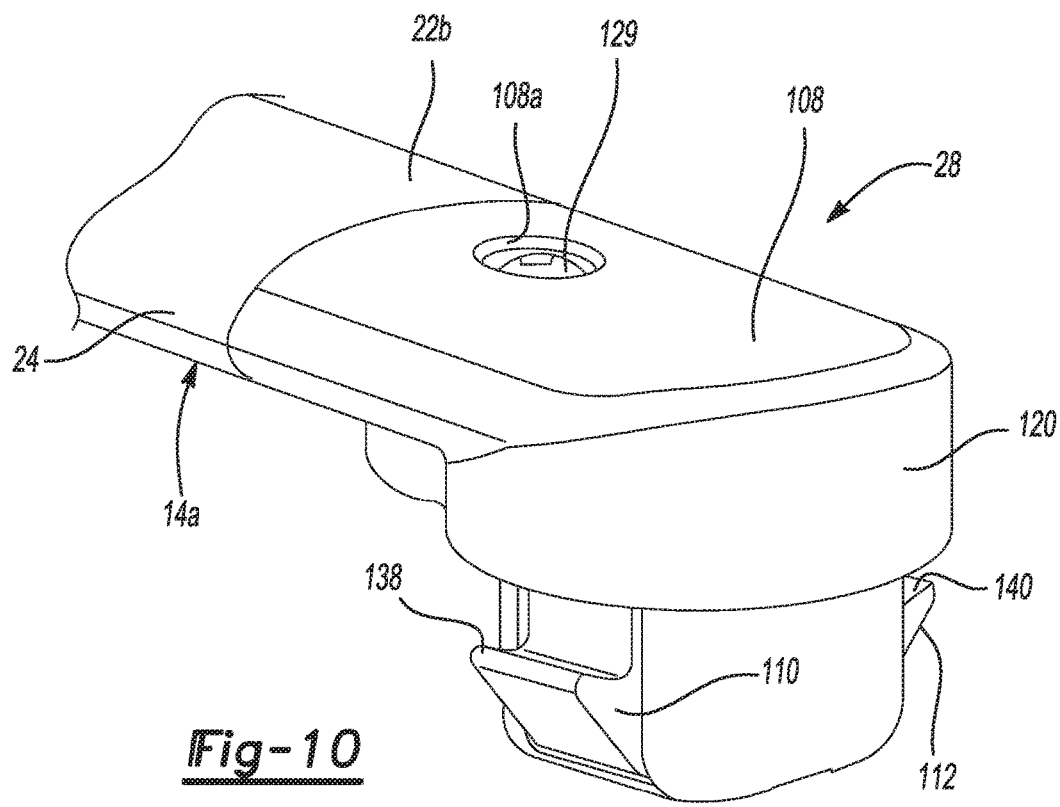
FIG. 10 is an enlarged perspective view of the second end of the cross bar of Figure of FIG. 9 but with the latching end support subsystem fully assembled.

With reference to FIGS. 9f and 9d, once fully assembled, the cover 108 may be secured to the main body 120 using threaded bolt 129. In FIG. 9f it can be seen that an underside of the cover 108 includes projecting tabs 108b, 108c and 108d. Tab 108b projects partially into the recess 119, and tabs 108c and 108d lay over the areas 133 adjacent the pins 130 and 132.

Figure 11:
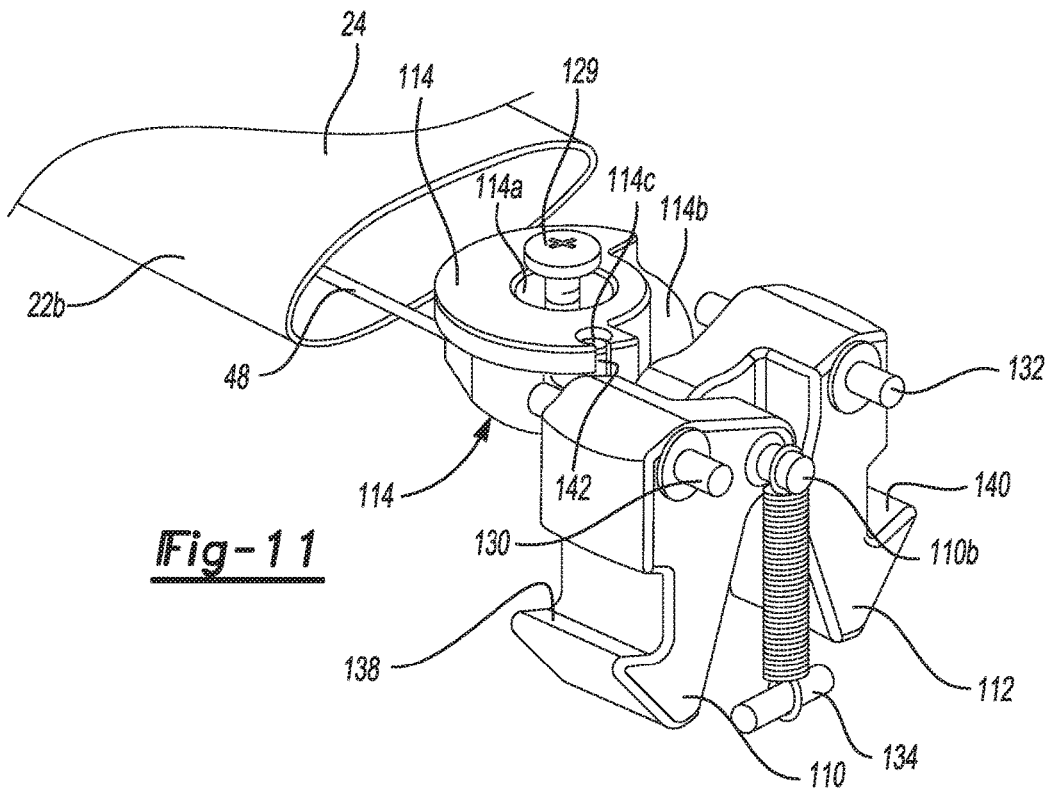
FIG. 11 a simplified perspective view of various components of the latching end support subsystem showing the latching arms in their extended positions.
Figure 12:
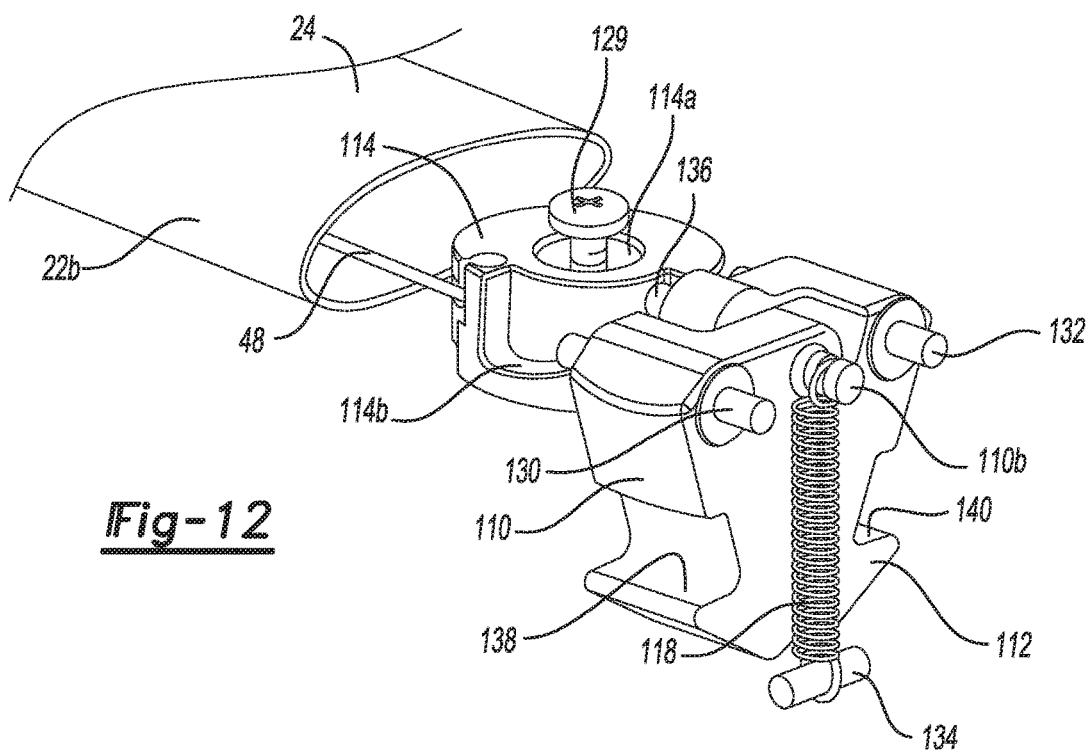
FIG. 12 is a simplified perspective view of the latching end support subsystem of FIG. 11 but with the latching arms shown in their retracted positions.
Figure 13:
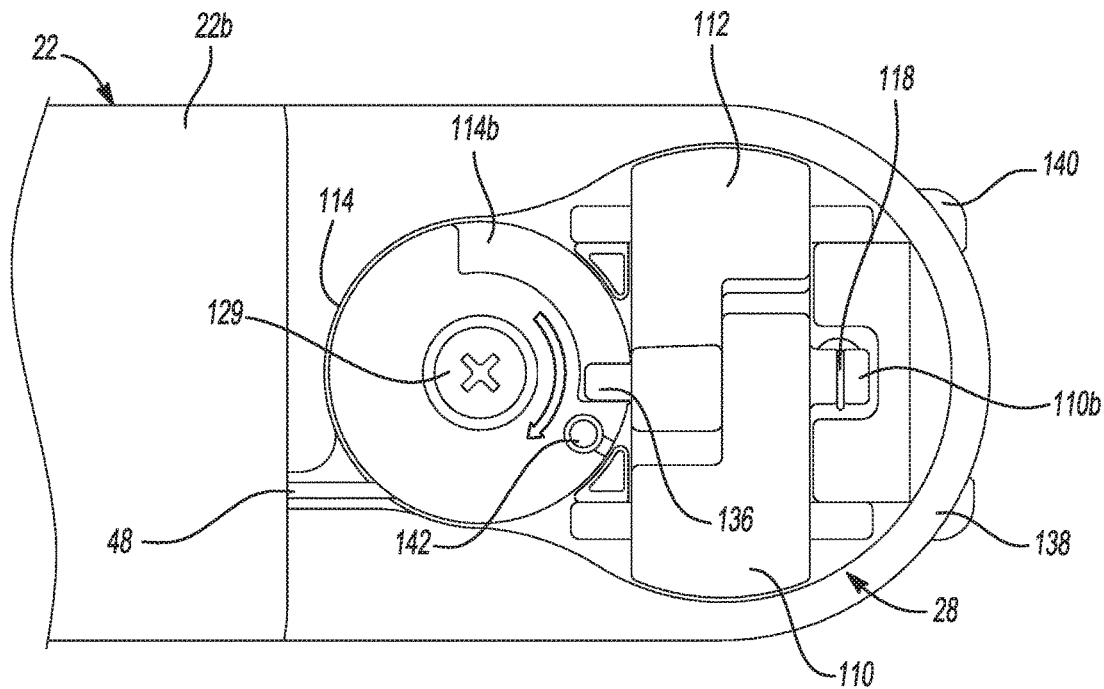
FIG. 13 is a plan view of the latching end support subsystem of FIG. 11 showing the camming element in the position it assumes when the latching arms are in their extended positions.
Figure 14:
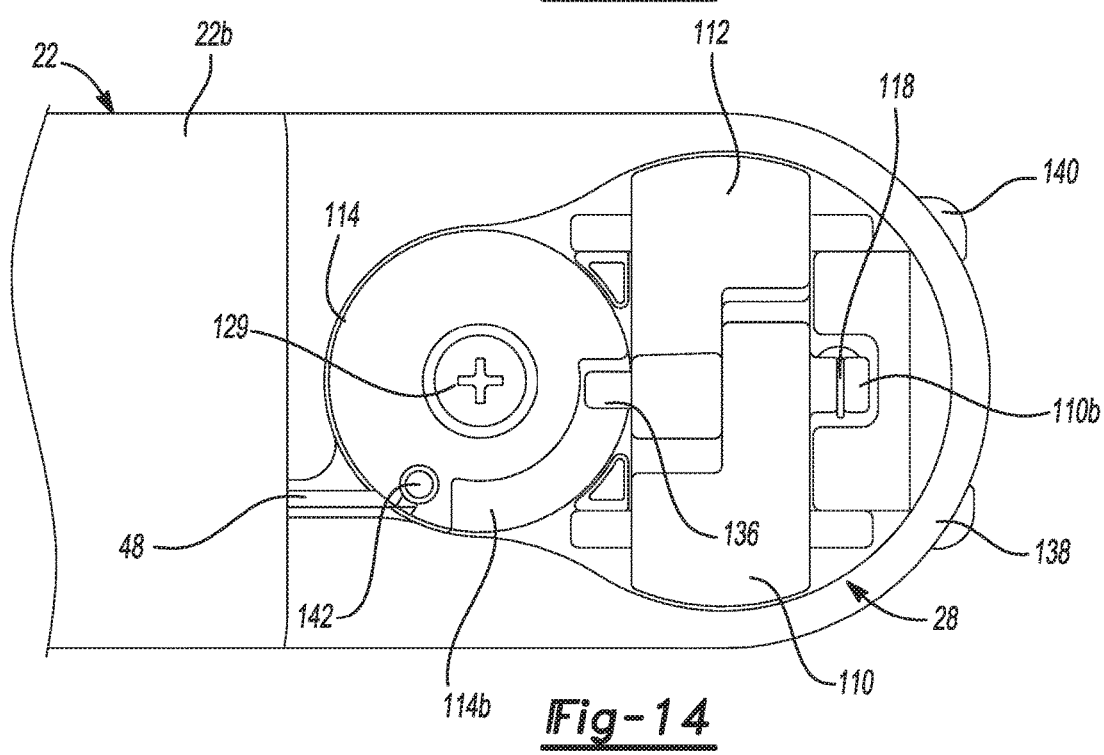
FIG. 14 is a plan view of the latching end support subsystem of FIG. 13 but showing the camming element in the position it assumes when the latching arms are in their retracted positions.

The latching arm 112 further includes an ear portion 112b with a portion of a pin 112c projecting therefrom. The pin 112c rests within a slot 113 (FIG. 9e) in a back side of the latching arm 110 when the latching arms 110 and 112 are assembled together. The latching arms 110 and 112 are shown assembled together in FIGS. 9d and 10-12. Another pin 136 (shown in FIG. 9) is positioned in a hole 121 in a backside of the ear portion 112b of latching arm 112, as shown in FIGS. 9d and 9e. The pin 136 is positioned so that it rides on a camming surface 114b of the camming element 114. This is shown in FIGS. 13 and 14. As camming element 114 is rotated in a first rotational direction, the camming surface 114b lifts the pin 136, which causes simultaneously pivoting motion of the latching arms 110 and 112 toward each other into retracted positions against the biasing force provided by coil spring 118. The latching arms 110 and 112 are shown in their fully retracted positions in FIG. 12. Rotating the camming element 114 in the opposite direction (i.e. second rotational direction) allows the coil spring 118 to pull the pin 136 downwardly, which rotates the latching arms 110 and 112 into their extended positions as shown in FIG. 11. FIG. 13 shows the pin 136 at one extreme end of the camming surface 114b. In this position the latching arms 110 and 112 will be in their outwardly extending positions (as shown in FIG. 11).

Referring further to FIGS. 9 and 11, an end of the cable 48 is positioned in the groove 124 and wrapped partially around the camming element 114. A tab 142 at the end of the cable 48 engages within a recess 114c in the camming element 114. Lifting the actuating lever 60 thus serves to pull the cable 48 end having the tab 142 against the biasing force provided by the coil spring 118 and the torsion spring 116. This causes rotation of the camming element 114 in the first rotational direction, which lifts the pin 136, which causes pivoting motion of the latching arms 110 and 112 into their retracted positions. When the actuating lever 60 is released, the coil spring 118 pulls the pin 136 downwardly, which causes rotation of the camming element 114 in the opposite rotational direction, with the assistance of the biasing force provided by the torsion spring 116, and thus causes the latching arms 110 and 112 to move into their extended positions (FIG. 11).

Figure 15:
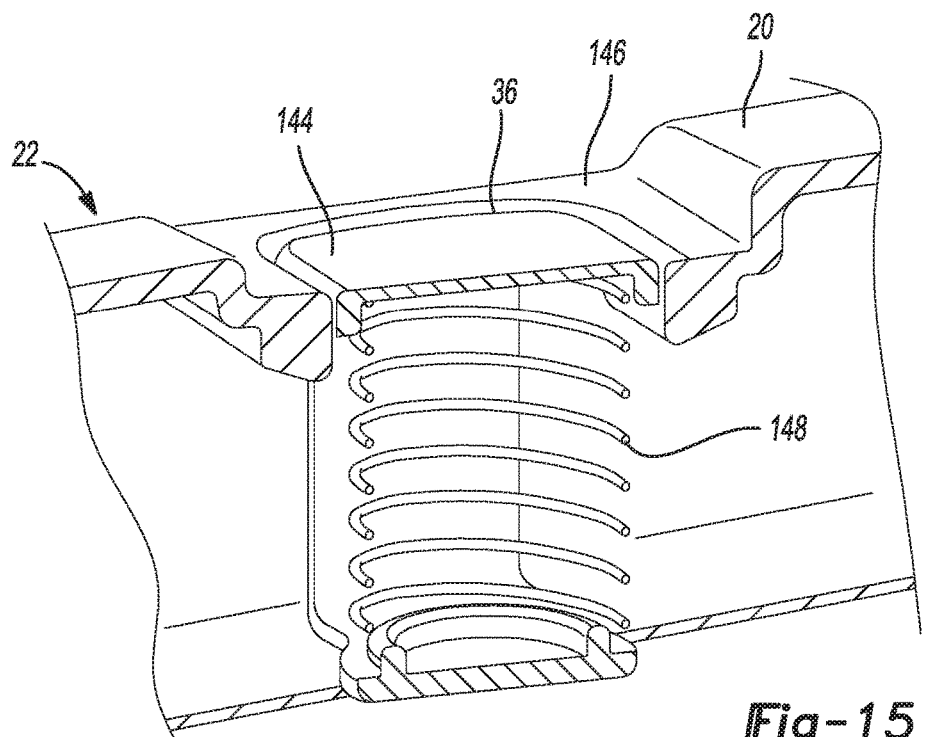
FIG. 15 is an enlarged plan view of the rear latching recess of FIG. 2 showing the spring loaded cover in its fully upward position.
Figure 16:
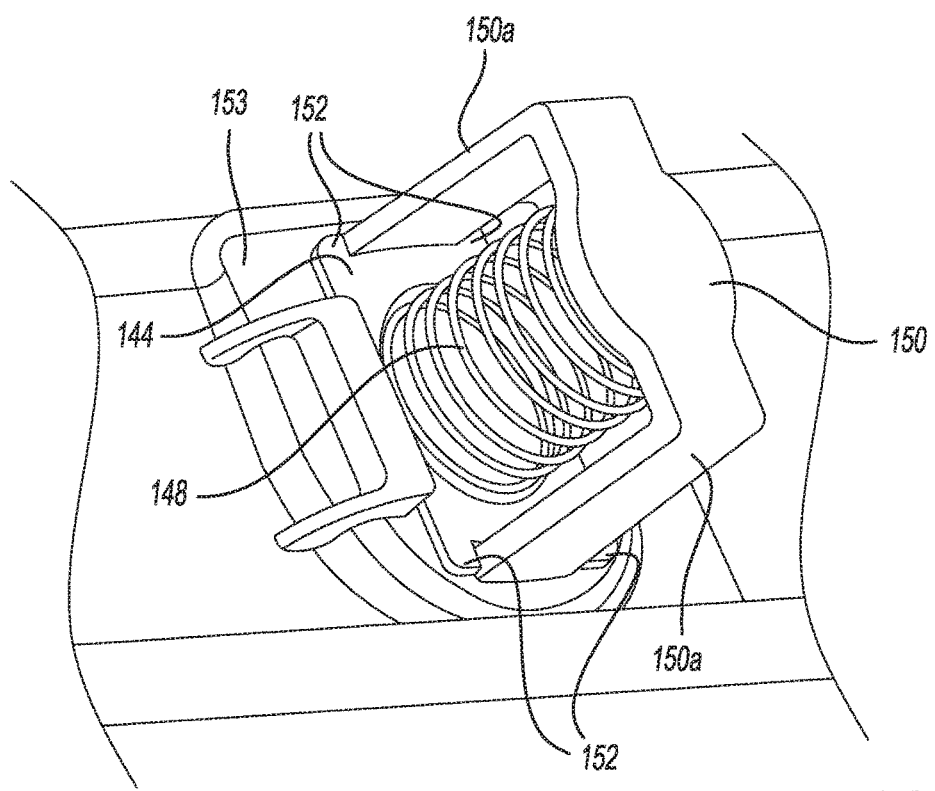
FIG. 16 is a bottom perspective view of the rear latching recess of FIG. 15 showing the U-shaped frame member that holds the spring in place.

Referring to FIGS. 15 and 16, the construction of the rear latching recess 36 of side rail 14a can be seen in greater detail. FIG. 15 shows the latching recess 36 having a movable cover 144. The cover 144 is biased into a position generally flush with a support surface 146 associated with the latching recess 36 by a coil spring 148 when the second end 22b of the cross bar 22 is not attached thereto. The coil spring 148 rests on U-shaped frame component 150, as shown in FIG. 16. The cover 144 is prevented from being pushed out past the support surface 146 by a plurality of stop elements 152 (FIG. 16). The cover 144 engages an inner surface 153 of side rail 14a, which limits its upward movement. Arm portions 150a and 150b of the U-shaped frame component 150 allow the cover 144 to move slidably up and down. The stop elements 152 have been omitted from FIG. 15 for clarity.

FIGS. 17 and 18 show the latching end support subsystem 28 in its latched position and unlatched position, respectively, relative to the latching recess 38. In FIG. 17 it can be seen that when in the latched position, the jaws 138 and 140 engage flange portions 154 and 156, respectively. The cover 144 is pushed down which compresses the spring 148. The upward biasing force provided by the spring 148 serves to reduce the possibility of any rattle of the second end 22b of the cross bar 22 when it is in its operative or stowed positions. When the cover 144 is in its raised position (FIG. 15) it closes off the latching recess 38 and helps to form an aesthetically pleasing and aerodynamically efficient surface. When the latching end support subsystem 28 is urged into its unlatched position, as shown in FIG. 18, the jaws 138 and 140 are free to clear the flange portions 154 and 156, respectively. In this orientation the second end 22b is free to be lifted up and away from the latching recess 38.

To move cross bar 22 from its stowed to its operative position the user simply lifts up on the actuating lever 60. This retracts the latching arms 110 and 112 and releases the latching end support subsystem 28 at the second end 22b of the cross bar 22. The spring 148 in the latching recess 36 will then push the second end 22b of the cross bar 22 upwardly as the cover 144 is raised. This frees the second end 22b from the side rail 14a. The user may then release the actuating lever 60 and use his/her other hand to help rotate the cross bar 22 into its operative position extending perpendicular to the side rail 14a. As the user rotates the cross bar 22 the rotating end support subsystem 26 at the first end 22a of the side rail 14a lifts the first end 22a upwardly. When the user has the second end 22b aligned over the latching recess 38 in the side rail 14b, the user lowers the second end so that the latching arms 110 and 112 enter the latching recess 38. The weight of the cross bar 22 assists in seating the second end 22b in the latching recess 38, thus requiring little or no additional effort on the part of the user. As the latching arms 110 and 112 enter the latching recess 38 they are compressed towards one another into the retracted position, before snapping outwardly as the jaws 138 and 140 clear the flanges 154 and 156. The above operations are reversed in order when the cross bar 22 needs to be moved from its operative position back into its stowed position. The operations of moving the cross bar 23 from the stowed position to the operative position, or vice versa, are identical to that described for cross bar 22. The operation of moving each cross bar 22 and 23 between its stowed and operative positions takes mere seconds and can be accomplished without requiring significant strength, and without the need for any external tools. Thus, even a single individual of limited strength and stature can easily manipulate the cross bars 22 and 23 between their stowed and operative positions.

It will be appreciated that while only the operation and construction of cross bar 22 has been described, the construction and operation of cross bar 23 is identical. Likewise, the construction of mounting recess 32 is identical to mounting recess 30, and the construction of forward latching recess 38 is identical to that of rear latching recess 36.

Figure 20:
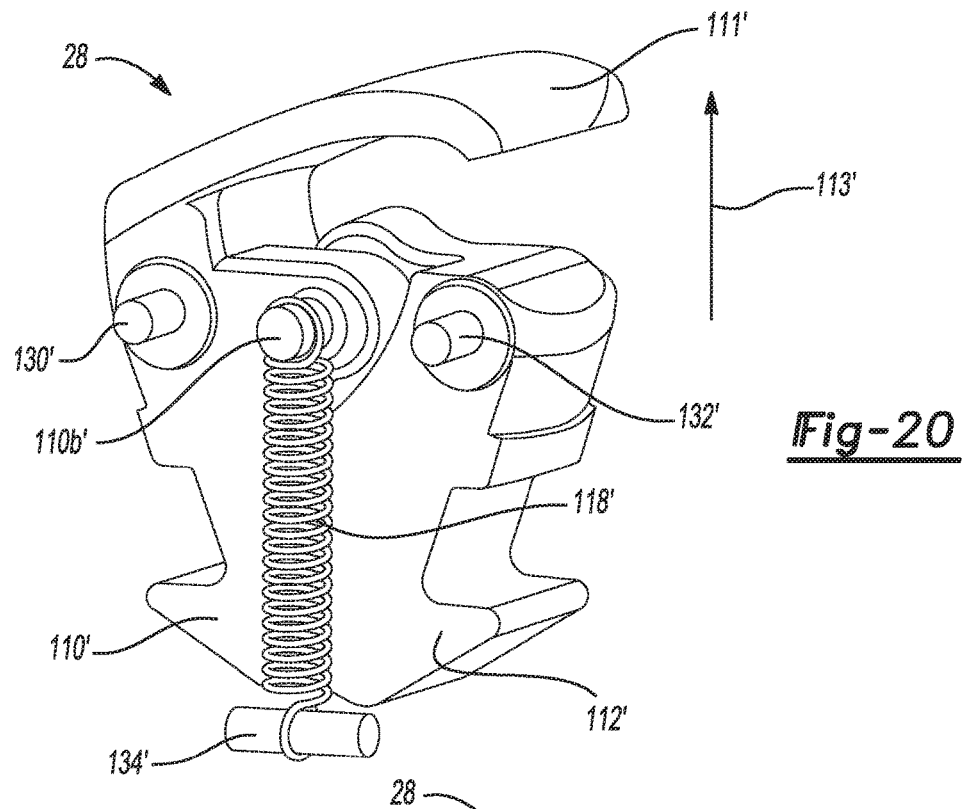
FIG. 20 shows the latching end support subsystem of FIG. 19 with the latching arms in the unlocked position when a lifting force is applied to the graspable actuating component.
Figure 21:
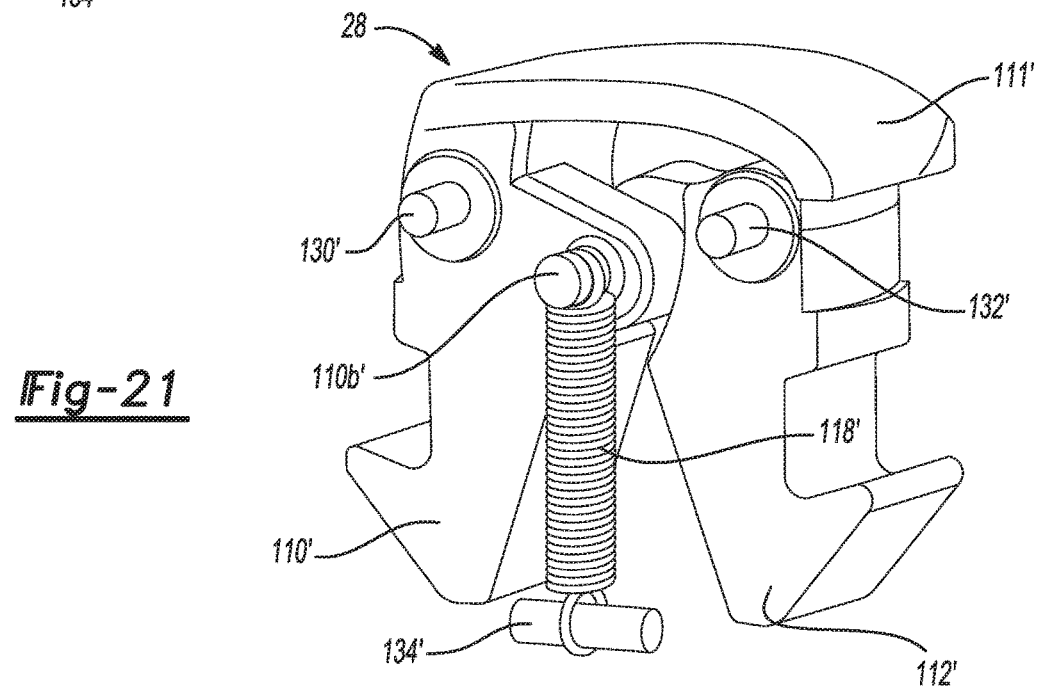
FIG. 21 shows the latching end support subsystem of FIG. 19 with the latching arms biased into the locked position when no lifting force is applied to the graspable actuating component.

Referring to FIGS. 19-21, a latching end support subsystem 28' is disclosed in accordance with another embodiment of the present disclosure. The latching end support subsystem 28' is similar to the subsystem 28 with the exception that one of the latching arms 110' and 112', in this example latching arm 110', includes a user graspable portion forming an actuating component 111', which operates as the equivalent component to the actuating component 60 of latching end support subsystem 28. The actuating component 111' may be grasped using one or more fingers and lifted in accordance with arrow 113' in FIG. 20 to enable the latching end support subsystem 28' to be unlatched directly from the second end 22b of the cross bar 22, rather than indirectly from the first end 22a of the cross bar 22. The latching end support subsystem 28' may be employed at the second ends 22b and 23b of the cross bars 22 and 23, or possibly just on one of the cross bars 22 or 23.

The latching end support subsystem 28' is similar to the subsystem 28 in that it relies on a biasing element, in this form a coil spring 118' hooked onto a pin 110b', which biases the latching arms 110' and 112' into normally outwardly extending orientations (i.e., a normally latched orientation). Pins 130' and 132' are seated in channels 130a' and 132a' in a main body 120', and extend through bores 110a' and 112a' in the latching arms 110' and 112', respectively, to enable pivoting movement of the latching arms. The latching arms 110' and 112' are further coupled by a pin and a bore (not shown in FIG. 19) which are identical to pin 112c and bore 113 in FIG. 9e. The coil spring 118' is secured at one end to a pin 134' (FIG. 19) and at its opposite end to pin 110b'.

It will be appreciated that with the latching end support subsystem 28', the actuating lever 20, cable 48, camming element 114, pin 136 and guide wheel 74 will not be needed. The control of the latching and unlatching of the cross bar 22 will be performed by the user solely at the second end 22b of the cross bar 22, and at the second end 23b of the cross bar 23. Thus, it will be appreciated that the latching end support subsystem 28' allows for the elimination of a number of components that would otherwise be used with subsystem 28 and the cross bar 22 or 23, and thus a reduction in the overall cost for the system 10.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A vehicle article carrier system for supporting articles elevationally above an outer body surface of a vehicle, the system including:
    a first side rail having a first mounting recess at a first end thereof, and a first forward latching recess and a first rear latching recess at a second end thereof
    a second side rail having a second mounting recess at a second end, and a second forward latching recess and a second rear latching recess at a first end thereof;
    a first cross bar having a first rotating end support subsystem at a first end thereof and being operably coupled to the first mounting recess to enable simultaneous pivotal and elevational movement of the first end of the first cross bar;
    a second cross bar having a second rotating end support subsystem at a first end thereof and being operably secured to the second mounting recess of the second side rail to enable simultaneous pivotal and elevational movement of the first end of the second cross bar;
    a first latching end support subsystem for latching the first cross bar in stowed and operative positions using selected ones of the first and second forward latching recesses;
    a second latching end support subsystem for latching the second cross bar in stowed and operative positions using selected ones of the first and second rear latching recesses;
    a first user engageable actuating component for enabling unlatching of the first latching end support subsystem, to thus enable the first cross bar to be moved from an operative position to a stowed position, or from the stowed position to the operative position;
    a second user engageable actuating component for enabling unlatching of the second latching end support subsystem, to thus enable the second cross bar to be moved from the operative position to the stowed position, or from the stowed position to the operative position; and
    wherein both of the first cross bar and the second cross bar reside at a first elevation when in their stowed positions, over the first and second side rails, respectively, forming low profile configurations, and are both moved elevationally to a second elevation above the first elevation when rotated into their operative positions extending perpendicularly between the first and second side rails.

2. The system of claim 1, wherein the first rotating end support subsystem enables pivoting motion of the first cross bar about two orthogonal axes.

3. The system of claim 1, wherein the second rotating end support subsystem enables pivoting motion of the second cross bar about two orthogonal axes.

4. The system of claim 1, wherein:
    the first latching end support subsystem is arranged at a second end of the first cross bar and adapted to be coupled to the first forward latching recess of the first side rail when in the stowed position, or the second forward latching recess of the second side rail when in the operative position; and
    the second latching end support subsystem arranged at a second end of the second cross bar and adapted to be coupled to the first rear latching recess of the first side rail when in the operative position, or the second rear latching recess of the second side rail when in the stowed position.

5. The system of claim 4, further comprising a cable operatively coupled between the first user engageable actuating component and the first latching end support subsystem for enabling the first user engageable actuating component to control a locking an unlocking action of the first latching end support subsystem.

6. The system of claim 4, further comprising a second cable operatively coupled between the second user engageable actuating component and the second latching end support subsystem for enabling the second user engageable actuating component to control a locking and unlocking action of the second latching end support subsystem.

7. The system of claim 4, wherein each of the first and second rotating end support subsystems includes:
    an upper mounting body;
    a lower mounting member having a plurality of radially extending arms; and
    wherein the first mounting recess includes a plurality of helical grooves that receive the plurality of radially extending arms, and which help to cause elevational camming movement of the first end of its respective said first or second cross bar when the respective first or second cross bar is moved pivotally from the stowed position to the operative position.

8. The system of claim 4, further comprising a cable extending coaxially with the first cross bar and coupled at one end to the actuating component, and at an opposite end to the first latching end support subsystem, to enable the first latching end support subsystem at the second end of the first cross bar to be controlled by the actuating component at the first end of the first cross bar.

9. The system of claim 1, wherein the first user engageable actuating component is located at the first latching end support subsystem, and the second user engageable actuating component is located at the second latching end support subsystem.

10. A vehicle article carrier system for supporting articles elevationally above an outer body surface of a vehicle, the system including:
    a first side rail having a first mounting recess at a first end thereof, and a first forward latching recess and a first rear latching recess at a second end thereof
    a second side rail having a second mounting recess at a second end, and a second forward latching recess and a second rear latching recess at a first end thereof;
    a first cross bar having a first rotating end support subsystem at a first end thereof and being operably coupled to the first mounting recess to enable simultaneous pivotal and elevational movement of the first end of the first cross bar;
a second cross bar having a second rotating end support subsystem at a first end thereof and being operably secured to the second mounting recess of the second side rail to enable simultaneous pivotal and elevational movement of the first end of the second cross bar;
a first latching end support subsystem arranged at a second end of the first cross bar and adapted to be coupled to the first forward latching recess of the first side rail or the second forward latching recess of the second side rail;
a second latching end support subsystem arranged at a second end of the second cross bar and adapted to be coupled to the first rear latching recess of the first side rail or the second rear latching recess of the second side rail;
a first actuating component operably associated with the first rotating end support subsystem and operably coupled with the first latching end support subsystem, for securing the first cross bar in both an operative position and a stowed position;
a second actuating component operably associated with the second rotating end support subsystem of the second cross bar, and operably coupled with the second latching end support subsystem, for securing the second cross bar in both an operative position and a stowed position;
wherein the first cross bar resides at a first elevation when in the stowed position, over the first side rail, forming a low profile configuration, and is moved elevationally to a second elevation above the first elevation when rotated into the operative position such that the first cross bar extends perpendicularly between the first and second side rails; and
wherein the second cross bar resides at the first elevation when in the stowed position, over the second side rail, forming a low profile configuration, and is moved elevationally into the second elevation when the second cross bar is rotated into the operative position extending perpendicularly between the first and second side rails.

11. The system of claim 10, wherein the first rotating end support subsystem provides for pivoting movement of the first cross bar about two axes orthogonal to one another.

12. The system of claim 10, wherein the first and second end rotating end support subsystems are identically constructed.

13. The system of claim 10, wherein the first rotating end support subsystem includes:
an upper mounting body;
a lower mounting member having a plurality of radially extending arms; and
wherein the first mounting recess includes a plurality of helical grooves that receive the plurality of radially extending arms, and which help to cause elevational camming movement of the first end of the first cross bar when the first cross bar is moved pivotally from the stowed position to the operative position.

14. The system of claim 10, further comprising a cable extending coaxially with the first cross bar and coupled at one end to the actuating component, and at an opposite end to the first latching end support subsystem, to enable the first latching end support subsystem at the second end of the first cross bar to be controlled by the actuating component at the first end of the first cross bar.

15. The system of claim 10, wherein the first and second latching end support subsystems are identical in construction.

16. The system of claim 14, wherein the first latching end support subsystem includes a pair of pivotally mounted latching arms, a rotationally supported camming element having a camming surface, a pin coupled to both of the latching arms and positioned to ride on the camming surface, and a biasing element operatively coupled to one of the latching arms;
wherein movement of the actuating component into an unlocked position causes rotational movement of the camming element in a first rotational direction along the camming surface, which causes the pin to move elevationally in a first direction to pivot the latching arms toward one another, to place the first latching end support subsystem in an unlocked condition allowing removal from one or the other of the first forward latching recesses; and
wherein movement of the actuating component into a locked positions causes rotational movement of the camming element in a second rotational direction along the camming surface, which causes the pin to move elevationally in a second rotational direction opposite to the first rotational direction to pivot the latching arms away from one another, to place the first latching end support subsystem in a locked condition relative to one or the other of the first forward latching recesses.

17. The system of claim 16, further comprising a torsion spring operably associated with the camming element for providing a biasing force that tends to urge the latching arms away from one another.

18. A vehicle article carrier system for supporting articles elevationally above an outer body surface of a vehicle, the system including:
a first side rail having a first mounting recess at a first end thereof, and a first forward latching recess and a first rear latching recess at a second end thereof;
a second side rail having a second mounting recess at a second end, and a second forward latching recess and a second rear latching recess at a first end thereof;
a first cross bar having a first rotating end support subsystem at a first end thereof and being operably coupled to the first mounting recess to enable simultaneous pivotal and elevational movement of the first end of the first cross bar;
a second cross bar having a second rotating end support subsystem at a first end thereof and being operably secured to the second mounting recess of the second side rail to enable simultaneous pivotal and elevational movement of the first end of the second cross bar;
a first latching end support subsystem operably associated with a second end of the first cross bar, and securable at either the forward latching recess of the first side rail or the forward latching recess of the second side rail;
a second latching end support subsystem operably associated with a second end of the second cross bar, and securable at either the rear latching recess of the first side rail or the rear latching recess of the second side rail; and
wherein each of the first and second rotating end support subsystems include:
an actuating element for placing one of the first or second rotating end support subsystems in an unlocked condition;
an upper mounting body; and a lower mounting member having a plurality of arms that cooperate with the upper mounting body to cause a change in an elevation of its associated said first or second cross bar as said associated first or second cross bar is pivoted in a horizontal plane between stowed and operative positions.

19. The system of claim 18, wherein both of the first cross bar and the second cross bar reside at a first elevation when in their stowed positions, over the first and second side rails, respectively, forming low profile configurations relative to their respective said side rails, and wherein both are moved elevationally to a second elevation above the first elevation when rotated into their operative positions extending perpendicularly between the first and second side rails.

20. The system of claim 18, a first latching end support subsystem arranged at a second end of the first cross bar and adapted to be coupled to the first forward latching recess of the first side rail or the first forward latching recess of the second side rail; and
   a second latching end support subsystem arranged at a second end of the second cross bar and adapted to be coupled to the second rear latching recess of the first side rail or the second rear latching recess of the second side rail.

21. The system of claim 18, further comprising a cable extending coaxially with the first cross bar and coupled at one end to the actuating element, and at an opposite end to the first latching end support subsystem, to enable the first latching end support subsystem at the second end of the first cross bar to be controlled by the actuating element at the first end of the first cross bar.

22. The system of claim 18, wherein the first latching end support subsystem includes a pair of pivotally mounted latching arms, a rotationally supported camming element having a camming surface, a pin coupled to both of the latching arms and positioned to ride on the camming surface, and a biasing element operatively coupled to one of the latching arms;
   wherein movement of the actuating element into an unlocked position causes rotational movement of the camming element in a first rotational direction along the camming surface, which causes the pin to move elevationally in a first direction to pivot the latching arms toward one another, to place the first latching end support subsystem in an unlocked condition allowing removal from one or the other of the first forward latching recesses; and
   wherein movement of the actuating element into a locked position causes rotational movement of the camming element in a second rotational direction along the camming surface, which causes the pin to move elevationally in a second rotational direction opposite to the first rotational direction to pivot the latching arms away from one another, to place the first latching end support subsystem in a locked condition relative to one or the other of the first forward latching recesses.

* * * * *